(12) United States Patent
Dalal

(10) Patent No.: US 11,082,350 B2
(45) Date of Patent: Aug. 3, 2021

(54) NETWORK SERVER SYSTEMS, ARCHITECTURES, COMPONENTS AND RELATED METHODS

(71) Applicant: Xockets, Inc., San Jose, CA (US)

(72) Inventor: Parin Bhadrik Dalal, Milpitas, CA (US)

(73) Assignee: Xockets, Inc., San Jose, CA (US)

( * ) Notice: Subject to any disclaimer, the term of this patent is extended or adjusted under 35 U.S.C. 154(b) by 0 days.

(21) Appl. No.: 16/129,762

(22) Filed: Sep. 12, 2018

(65) Prior Publication Data
US 2019/0109793 A1   Apr. 11, 2019

Related U.S. Application Data

(63) Continuation-in-part of application No. 15/396,318, filed on Dec. 30, 2016, which is a continuation of (Continued)

(51) Int. Cl.
| | |
|---|---|
| *G06F 13/36* | (2006.01) |
| *H04L 12/851* | (2013.01) |
| *H04L 12/801* | (2013.01) |
| *G06F 13/28* | (2006.01) |
| *G06F 13/16* | (2006.01) |
| *H04L 29/06* | (2006.01) |
| *G06F 13/42* | (2006.01) |
| *G06F 13/40* | (2006.01) |
| *G06F 13/364* | (2006.01) |
| *H04L 12/931* | (2013.01) |
| *G06F 21/55* | (2013.01) |

(52) U.S. Cl.
CPC ...... *H04L 47/2441* (2013.01); *G06F 13/1605* (2013.01); *G06F 13/1652* (2013.01); *G06F 13/1673* (2013.01); *G06F 13/28* (2013.01); *G06F 13/364* (2013.01); *G06F 13/404* (2013.01); *G06F 13/4022* (2013.01); *G06F 13/4234* (2013.01); *G06F 21/55* (2013.01); *H04L 29/06* (2013.01); *H04L 47/10* (2013.01); *H04L 49/70* (2013.01); *H04L 63/0227* (2013.01); *Y02D 10/00* (2018.01)

(58) Field of Classification Search
CPC ...... G06F 12/0835; G06F 13/36; G06F 13/00; G06F 13/4282; G06F 13/385
USPC .......................... 710/104, 300–306, 105, 100
See application file for complete search history.

(56) References Cited

U.S. PATENT DOCUMENTS

| | | | | |
|---|---|---|---|---|
| 2003/0198189 A1* | 10/2003 | Roberts | ............... | H04L 45/00 370/252 |
| 2005/0198247 A1* | 9/2005 | Perry | ............... | H04L 7/0008 709/223 |
| 2012/0151004 A1* | 6/2012 | Pope | ............... | G06F 13/28 709/219 |

* cited by examiner

*Primary Examiner* — Tim T Vo
*Assistant Examiner* — Kim T Huynh

(57) ABSTRACT

A device can include a server that includes a host processor and at least one hardware acceleration (hwa) module having at least one computing element formed thereon, the at least one computing element including processing circuits configured to execute a plurality of processes, first memory circuits, second memory circuits, and a data transfer fabric configured to enable data transfers between the processing circuits and the first and second memory circuits; wherein the at least one computing element is configured to transfer data to, or receive data from, any of: the processing circuits, the first memory circuits, the second memory circuits, or other computing elements coupled to the data transfer fabric.

20 Claims, 15 Drawing Sheets

Related U.S. Application Data application No. 13/900,318, filed on May 22, 2013, now Pat. No. 9,558,351, and a continuation of application No. 15/283,287, filed on Sep. 30, 2016, now abandoned, which is a continuation of application No. PCT/US2015/023730, filed on Mar. 31, 2015, and a continuation of application No. PCT/US2015/023746, filed on Mar. 31, 2015.

(60) Provisional application No. 62/557,659, filed on Sep. 12, 2017, provisional application No. 62/557,661, filed on Sep. 12, 2017, provisional application No. 62/557,666, filed on Sep. 12, 2017, provisional application No. 62/557,670, filed on Sep. 12, 2017, provisional application No. 62/557,671, filed on Sep. 12, 2017, provisional application No. 62/557,675, filed on Sep. 12, 2017, provisional application No. 62/557,679, filed on Sep. 12, 2017, provisional application No. 62/557,687, filed on Sep. 12, 2017, provisional application No. 61/976,471, filed on Apr. 7, 2014, provisional application No. 61/973,207, filed on Mar. 31, 2014, provisional application No. 61/973,205, filed on Mar. 31, 2014, provisional application No. 61/753,892, filed on Jan. 17, 2013, provisional application No. 61/753,895, filed on Jan. 17, 2013, provisional application No. 61/753,901, filed on Jan. 17, 2013, provisional application No. 61/753,903, filed on Jan. 17, 2013, provisional application No. 61/753,904, filed on Jan. 17, 2013, provisional application No. 61/753,906, filed on Jan. 17, 2013, provisional application No. 61/753,910, filed on Jan. 17, 2013, provisional application No. 61/650,373, filed on May 22, 2012, provisional application No. 61/753,907, filed on Jan. 17, 2013, provisional application No. 61/753,899, filed on Jan. 17, 2013.

(BACKGROUND)

NETWORK SERVER SYSTEMS, ARCHITECTURES, COMPONENTS AND RELATED METHODS

PRIORITY CLAIMS

This application is a continuation of U.S. patent application Ser. No. 15/396,318, which is a continuation of U.S. patent application Ser. No. 13/900,318 filed May 22, 2013, now U.S. Pat. No. 9,558,351, which claims the benefit of U.S. Provisional Patent Application Nos. 61/650,373 filed May 22, 2012, 61/753,892 filed on Jan. 17, 2013, 61/753,895 filed on Jan. 17, 2013, 61/753,899 filed on Jan. 17, 2013, 61/753,901 filed on Jan. 17, 2013, 61/753,903 filed on Jan. 17, 2013, 61/753,904 filed on Jan. 17, 2013, 61/753,906 filed on Jan. 17, 2013, 61/753,907 filed on Jan. 17, 2013, and 61/753,910 filed on Jan. 17, 2013.

U.S. patent application Ser. No. 15/396,318 is also a continuation of U.S. patent application Ser. No. 15/283,287 filed Sep. 30, 2016, which is a continuation of International Application no. PCT/US2015/023730, filed Mar. 31, 2015, which claims the benefit of U.S. Provisional Patent Application No. 61/973,205 filed Mar. 31, 2014.

U.S. patent application Ser. No. 15/283,287 is also a continuation of International Application no. PCT/US2015/023746, filed Mar. 31, 2015, which claims the benefit of U.S. Provisional Patent Application Nos. 61/973,207 filed Mar. 31, 2014 and 61/976,471 filed Apr. 7, 2014.

The contents of all of these applications are incorporated by reference herein.

TECHNICAL FIELD

The present disclosure relates generally to systems of servers for executing applications across multiple processing nodes, and more particularly to systems having hardware accelerator modules included in such processing nodes.

DETAILED DESCRIPTION

Figure 1:
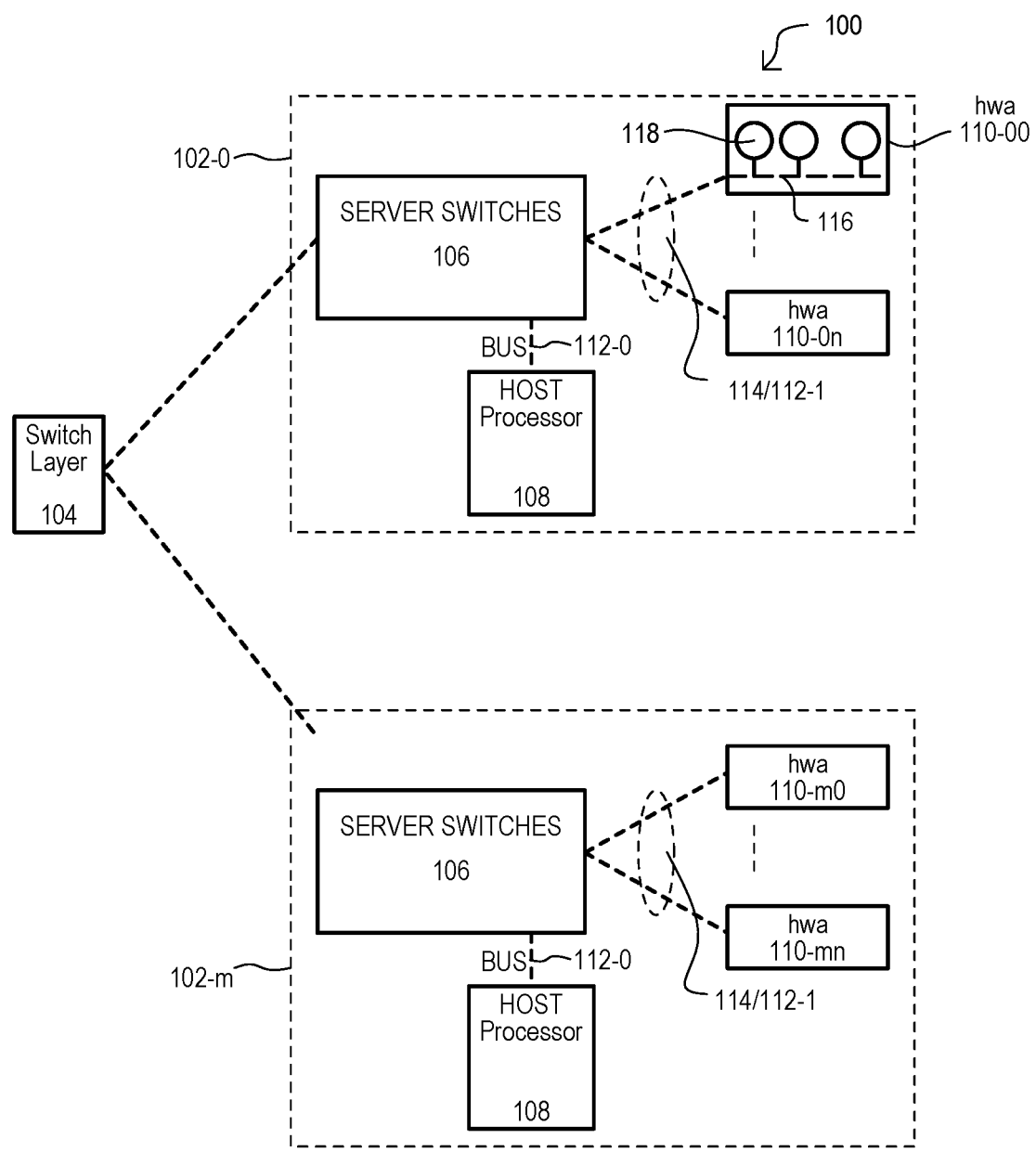
FIG. 1 is a block diagram of a system according to an embodiment.

Embodiments can include devices, systems and methods in which computing elements can be included in a network architecture to provide a heterogenous computing environment. In some embodiments, the computing elements can be formed on hardware accelerator (hwa) modules that can be included in server systems. The computing elements can provide access to various processing components (e.g., processors, logic, memory) over a multiplexed data transfer structure. In a very particular embodiment, computing elements can include a time division multiplex (TDM) fabric to access processing components.

In some embodiments, computing elements can be linked together to form processing pipelines. Such pipelines can be physical pipelines, with data flowing from one computing element to the next. Such pipeline flows can be within a same hwa module, or across a network packet switching fabric. In particular embodiments, a multiplexed connection fabric of the computing element can be programmable, enabling processing pipelines to be configured as needed for an application.

In some embodiments, computing elements can each have fast access memory to receive data from a previous stage of the pipeline, and can be capable of sending data to a fast access memory of a next computing element in the pipeline.

In some embodiments, hwa modules can include one or more module processors, different from a host processor of a server, which can execute a networked application capable of accessing heterogenous components of the module over multiplexed connections in the computing elements.

In the embodiments described, like items can be referred to with the same reference character but with the leading digit(s) corresponding to the figure number.

FIG. 1 is a block diagram of a system 100 according to an embodiment. A system 100 can include a number of servers 102-0 to 102-*m*, which can be networked together by one or more switching layers 104. A switching layer 104 can include an access pathway to other networks, including other systems, such as a LAN, WAN or the Internet, as but a few examples. A switching layer 104 can be any suitable device or architecture for enabling packet data to travel between servers, including but not limited to: a top-of-rack (TOR) switch, an access layer, an aggregation layer, a core portion, a leaf portion, or a spine portion of a network.

Each server (102-0 to -*m*) can include server switch(es) 106, one or more host processors 108, and one or more hwa modules 110-00 to -*mn*. Server switches 106 can be connected to host processor 108 and hwa modules (110-00 to -*mn*) by one or more buses 112-0/1. Buses 112-0/1 can be any suitable bus, including but not limited to a system bus (e.g., PCI, PCIe etc.) and/or memory bus (e.g., various generations of DDR, Hybrid Memory Cube, High Bandwidth Memory, etc.). Server switches 106 can include one or more network switches that enable packet data to be switched between switch layer 104, host processor 108, and hwa modules 110-00 to -nm.

As shown by hwa module 110-00, an hwa module 110-00 can include a number of computing elements (one shown as 118) which can execute operations on received data. Access to elements 118 can be via a fabric 116. Computing elements 118 can include any suitable computing circuit element including but not limited to: processors, processor cores, arithmetic logic unit(s) (ALUs), logic circuits, programmable logic circuits, standard memory (including volatile and nonvolatile memory), cached locations in memory, or specialized memory. In particular embodiments, computing elements 118 can be included in one or more integrated circuits (ICs) on an hwa module (110-00 to -mn), where multiple such ICs are connected by a bus, or other conductive structure.

In particular embodiments, fabric 116 can be a TDM switch fabric. Accordingly, timeslots of the TDM fabric can be assigned to computing elements, to enable data to be sent to the elements, accessed by the elements, or sent from the elements.

In some embodiments, a bus 112-1 that connects hwa modules (110-00 to 110-0n) of a same server 102-0 can serve as a fabric 114, that can have an access capability that matches that of fabric 116. Accordingly, in particular embodiments, intra-module fabric 116 can be a TDM fabric, and inter-module fabric 114 can enable TDM access to elements 118 in all the hwa modules (110-00 to 110-0n). Further, based on packet header data, packets can be tunneled onto a TDM slot for a particular element 118 (or component(s) in an element 118).

In operation, servers (102-0 to -n) can receive packet data to be processed. According to embodiments, such processing can be a pipelined processing, where one stage of processing is passed on to the next stage. Packet data can be received from switching layer 104 (including from another server). Server switch 106 can forward packet data to an hwa module (110-00 to -nm) based on information in the packet. Such information in the packet can include any suitable indicator, including layer 2 or layer 3 data, but in particular embodiments can include a higher level encapsulation of data, such as a vpn or similar approach (e.g., tunneling).

Packet data can be sent to an hwa module (110-00 to -nm) over bus 112-1, which in some embodiments can include an inter-module fabric 114. The packet data can then travel on a fabric 116 within the destination hwa module (110-00 to -nm) to an element 118. Within hwa module (110-00 to -nm) packet data can be processed in a pipelined fashion, traveling to subsequent elements 118. In some embodiments this can include using predetermined TDM channels. Once processing is complete, processed data travel out of hwa module 118. In some embodiments, processed packet data can be output over bus 112-1 and server switch 106 back onto switching layer.

It is understood that "processing" by an element 118 can include received data altering a process executed by an element 118. As but one example, an element 118 can include a processor executing an operation, and such an operation can be altered by received packet data.

It is also understood that hwa modules (110-00 to 110-mn) can operate independently of host processors 108. In such embodiments, packet data can be forwarded into and out of hwa modules (110-00 to 110-mn) without requiring action by host processors 108.

Figure 2A:
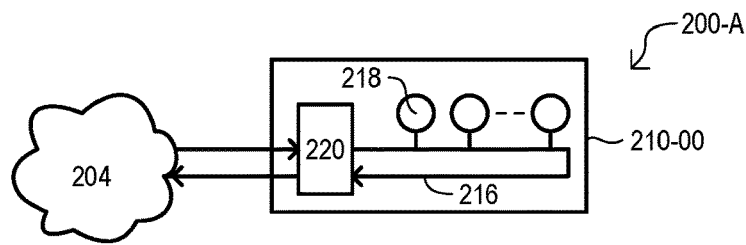
FIGS. 2A to 2C are diagrams of systems according to various embodiments.
Figure 2B:
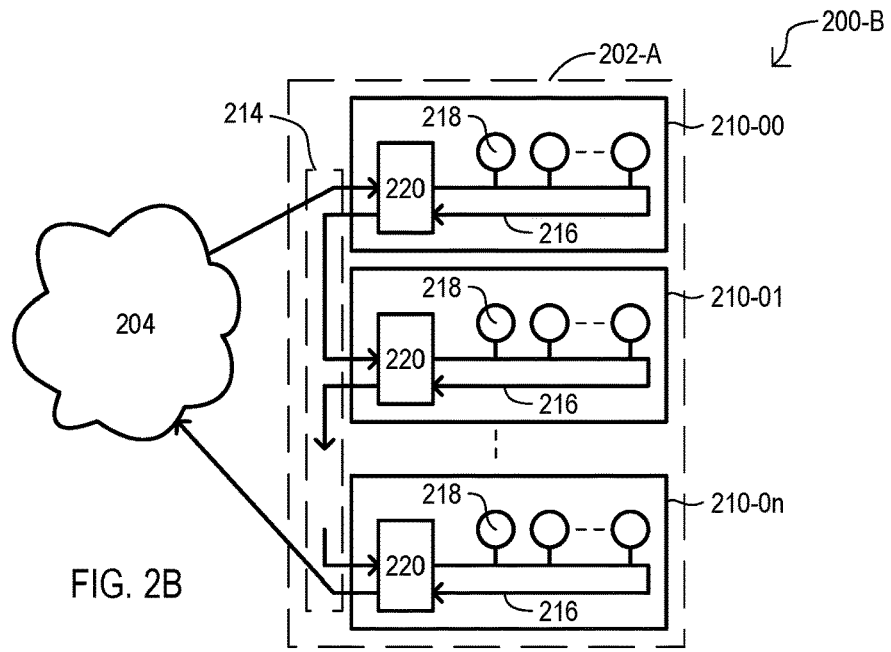
Figure 2C:
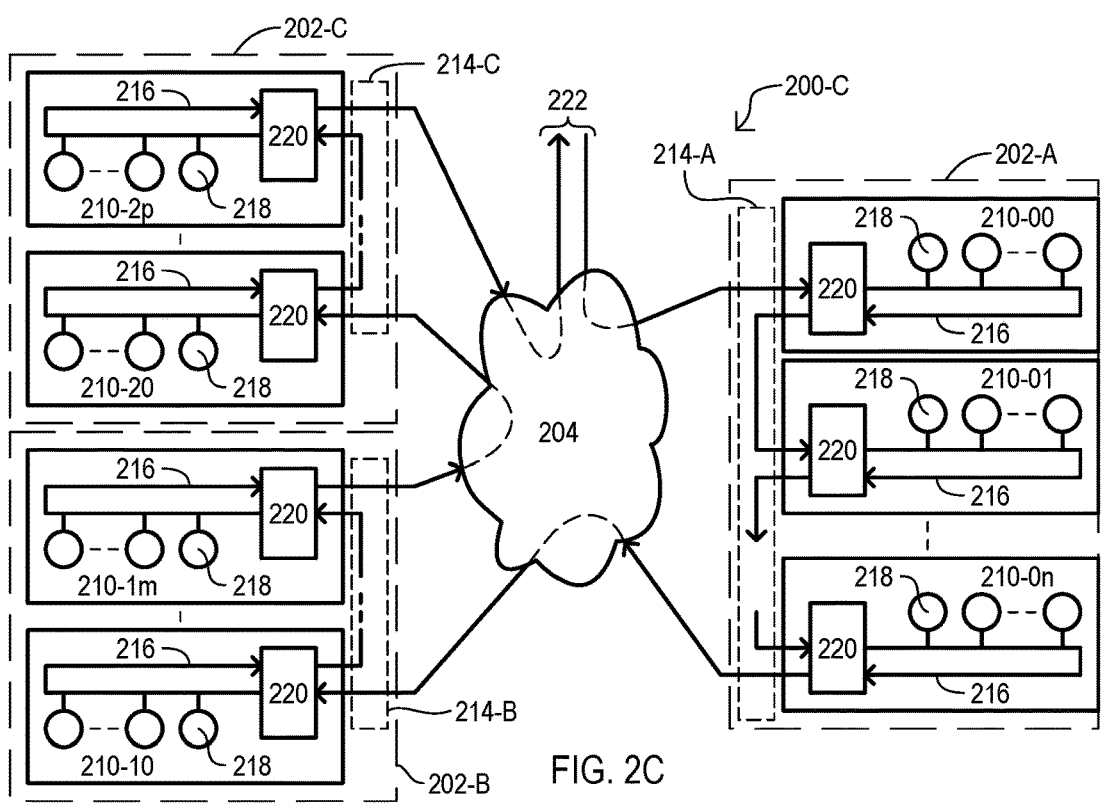

FIGS. 2A to 2C show configurations and methods for scaling up processing according to embodiments. FIG. 2A to 2C show various systems, which in particular embodiments, can be particular versions of system 100 of FIG. 1.

FIG. 2A shows a system 200-A having processing by elements in one hwa module 210-00. Packet data can be received from a switching layer 204. Within hwa module 210-00, a switching circuit 220 can forward data to one or more compute elements 218 over a fabric 216, which in some embodiments can be a TDM fabric. A switching circuit 220 can be any suitable structure for translating received packet data to data transmission over fabric 216 (e.g., within a particular TDM channel). In some embodiments, switching circuit 220 can include a switch circuit or virtual switch in conjunction with a wired or wireless network interface. Further, other embodiments can include additional translation, such as writes over a memory bus, in which case a switching circuit can include a memory controller, or the like. Accordingly, it is understood that packet data can be received at an hwa module 210-00 directly from a network (e.g., 204) via a network interface on hwa module 210-00, or via another network interface on a server in which the hwa module 210-00 is attached (e.g., a PCI bus, memory bus, etc.).

Data processed by and/or generated within hwa module 210-00 can be output via switching circuit 220 back to switching layer 204.

FIG. 2B shows a system 200-B in which pipelined processing can be scaled up within a server by use of additional hwa modules. Referring to FIG. 2B, a server 202-A can include multiple hwa modules 210-00 to -On. Received packet data can be processed by one or more elements 218 in hwa module 210-00, then forwarded to a next hwa module 210-01, where it can be further processed by elements in the next hwa module. Such processing can continue through multiple hwa modules (210-00 to -0n) of a same server 202-A. In particular embodiments, a processing pipeline can reserve TDM channels on each hwa module (210-00 to -0n), enabling packet data to be received from switching layer 204 at hwa module 210-00.

Referring still to FIG. 2B, different hwa modules (210-00 to -0n) can be in communication via data path 214, which in some embodiments can also be a TDM data path. In very particular embodiments, data path 214 can be a TDM data path synchronized with fabric 216 internal to hwa modules (210-00 to -0n).

As in the case of FIG. 2A, data processed by and/or generated within hwa modules (210-00 to -0n) can be output via switching circuit 220 in hwa module 210-0n back to switching layer 204.

While FIG. 2B shows a processing pipeline that can be deepened by a serial flow through multiple hwa modules (210-00 to -0n), scaling up can occur in parallel, as well, by sending packet data to hwa modules in parallel.

FIG. 2C shows a system 200-C in which pipelined processing can be scaled up between multiple servers. Referring to FIG. 2C, a number of servers 202-A/B/C can be interconnected via switch layer 204. Each server (202-A/B/C) can include multiple hwa modules 210-00 to -0n, 210-10 to -1m, and 210-20 to -2p. A processing pipeline can reserve TDM channels on each hwa module (210-00 to -2p), enabling data to be received from switching layer 204 at hwa module 210-00, and then processed with elements 218 in all hwa modules (210-00 to -2p).

As in the case of FIG. 2B, hwa modules of same server can be in communication via a data path 214-A, 214-B, 214-C, any or all of which can be TDM data paths. Further, parallel scaling can occur by sending packet data to servers 202-A/B/C in parallel for processing by hwa modules in series and/or in parallel.

As in the case of FIG. 2A, data processed by and/or generated within hwa modules (210-00 to -2p) can be output via switching circuit 220 in hwa modules (210-00 to -2p) back to switching layer 204.

It is understood that unlike conventional accelerated server systems which can form virtual processing pipelines, systems like those of FIGS. 2A to 2C form a physical processing pipeline, with data being transmitted from one computing element to the next.

It is also understood that a pipeline need not include each computing element in an hwa module. That is, a pipeline can be configured to use as few as one computing element of a hwa module.

Figure 3:
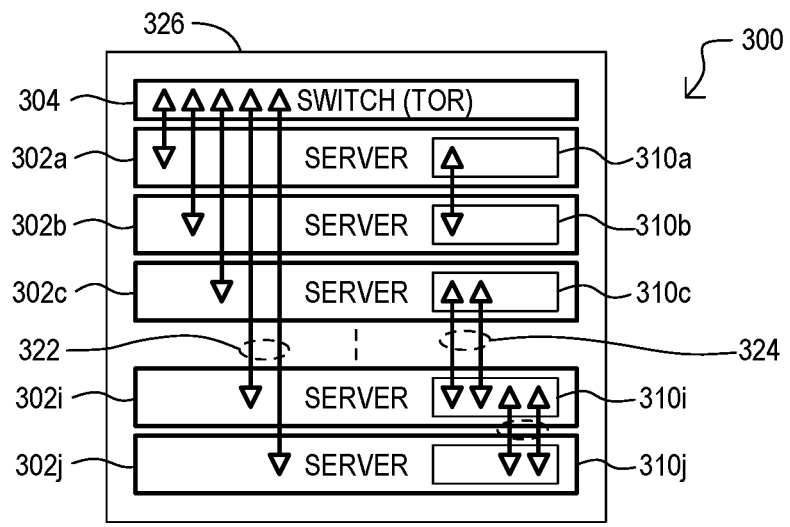
FIG. 3 is a diagram of a system according to another embodiment.

FIG. 3 is a diagram of a system 300 according to another embodiment. In particular embodiments, system 300 can be one particular version of that shown in FIG. 1.

A system 300 can include a number of servers (302a to 302j) arranged into a group 326 that is joined together by a switch device 304. While servers (302a to 302j) can take various forms, in a particular embodiment, servers (302a to 302j) can be rack mounted servers and switch device 304 can be a top of rack (TOR) type switch. However, alternate embodiments can include any other suitable logical or physical grouping of servers. Servers (302a to 302j) can include one or more hwa modules (310a to 310j).

Each server (302a to 302j) can have multiple input/output (I/O) ports, which can support connections based on any suitable protocol, including but not limited to: Ethernet or related, Infiniband, or Fibre Channel, as but a few examples. A system 300 can include inter-server connections (two shown as 322) between switch device 304 and each server (310a to 310j) via such I/O ports. In some embodiments, inter-server switch connections 322 can transmit data via a TDM data path. Such a TDM data path may, or may not, be synchronized with a TDM fabric within an hwa module (310a to 310j).

According to embodiments, additional connections can be enabled between individual servers (302a to 302j) by operation of hwa module modules (310a to 310j). In the particular embodiment shown, a system 300 can include inter-module connections (two shown as 324) between different hwa modules (e.g., 310c and 310i). Inter-module connections 324 can enable direct data transfer between servers (302a to 302j) using offload processor modules (310a to 310j). Inter-module connections 324 can be via 10ports for such hwa modules. As in the case of inter-server connections 322, inter-module connections 324 can transmit data via a TDM data path that may, or may not, be synchronized with a TDM fabric within a hwa module (310a to 310j).

Accordingly, while this embodiment includes a switch device 304 for server-to-server, or server-to-multiple server data transfers, alternate embodiments can have no switch device 304 as inter-module connections 324 can provide a TDM switch fabric for system 300.

Hwa modules (310a to 310j) can take the form of any of those described herein, or equivalents. Accordingly, in addition to 10 ports, hwa modules (310a to 310j) can include computing elements accessible by a fabric (e.g., a TDM fabric). In addition, hwa modules (310a to 310j) can include a physical connector to connect the module to a bus in a server (302a to 302j). In very particular embodiments, a connector can be a memory connector, and hwa modules (310a to 310j) can include a memory interface. Still further, hwa modules (310a to 310j) can include local memory and control logic for directing data, including network packets, to memory, server, or hwa modules.

In particular embodiments, a module connector can be compatible with a dual in-line memory module (DIMM) slot of a computing system. Since each server typically contains multiple DIMM slots, a mix of hwa module modules and DIMM memory can be supported.

Figure 4:
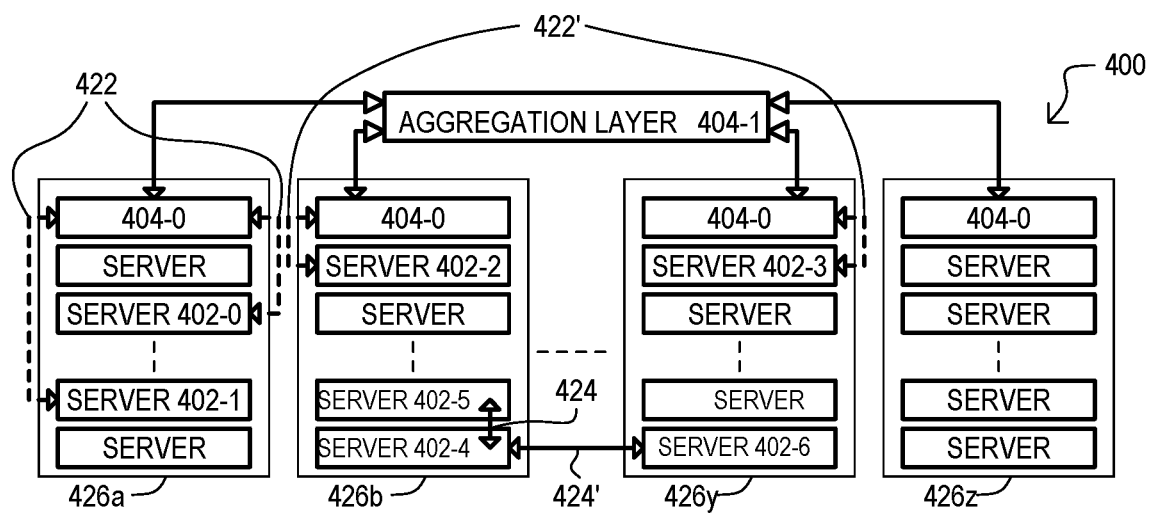
FIG. 4 is a diagram of a system according to a further embodiment.

FIG. 4 shows a system 400 according to a further embodiment. In particular embodiments, system 400 can be one particular version of that shown in FIG. 1.

A system 400 can include multiple server groups 426a to 426z having servers (some shown as 402-0 to 402-6) connected through their respective switch device 404-0. It is understood that some or all of the servers can include hwa modules (not shown) as described herein, or equivalents. Switch devices 404-0 can communicate with each other through an aggregation layer 404-1 Aggregation layer 404-1 may include several switches and routers and can act as an interface between an external network and groups (426a to 426z). In this tree-like topology, communication between various servers (one shown as 402-0) can be routed through the corresponding switch devices 404-0 and aggregation layer 404-1. In particular embodiments, groups (426a to 426z) can be racks and switch devices 404-0 can be TOR switches.

Packet data can be transmitted between servers of a same group via their common switch device. One example is shown by intra-group server connection 422 between servers 402-0 and 402-1. Packet data can be transmitted between servers of different groups via aggregation layer 404-1 and their respective switch device 404-0. One example is shown by inter-group server connection 422' between servers 402-2 and 402-3. It is understood that such connections can include network interfaces on the servers, which may or may not be part of a hwa module. According to some embodiments, either or both of intra- and inter-group server connections (422/422') can include TDM channels which may, or may not, be synchronized with a TDM fabric within the hwa modules.

Packet data can also be transmitted directly between servers through their corresponding hwa modules. Such connections can be between servers of a same group. One example is shown by intra-group module connection 424 between servers 402-4 and 402-5. Further, packet data can be transmitted between servers of different groups via their corresponding hwa modules. One example is shown by inter-group module connection 424' between servers 402-4 and 402-6.

According to embodiments, either or both of intra- and inter-group module connections (424/424') can include TDM channels which may, or may not, be synchronized with a TDM fabric within the hwa modules.

Figure 5:
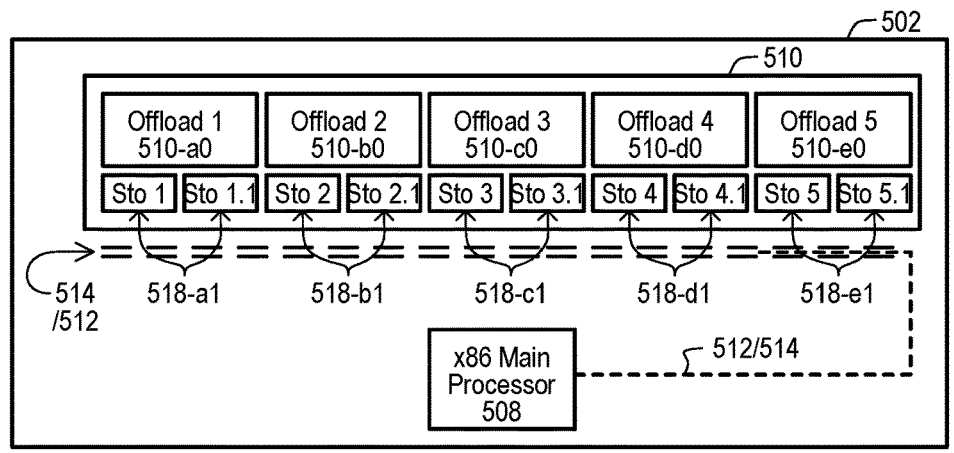
FIG. 5 is diagram of a hardware accelerator (hwa) module that can be included in embodiments.

FIG. 5 is a diagram illustrating a server 502 according to an embodiment. A server 502 can include a removable hwa module 510 for offload processing from a host processor 508 to the connected hwa module 510. An hwa modules 510 can take the form of any of those described herein, or an equivalent, and can have multiple computation elements 518-a0 to 518-e0 for executing processing tasks independent of a main processor 508. In the embodiment shown, computation elements can include offload processors 518-x0 as well as module memory 518-x1 (where x=a to e) which is accessible by the offload processors 518-x0. In particular embodiments, offload processors 518-x0 can be "light touch" processors (e.g., ARM-type processors) while a host processor 508 can be a "heavy touch" processor (e.g., x86 or the like).

Hwa module 510 can be removably connected to a bus 512. Bus 512 can be any suitable bus on a server, including a PCI, PCIe, or other bus. However, in some embodiments bus 512 can be a memory bus. In a particular embodiment, hwa module 510 can be inserted into a Dual Inline Memory Module (DIMM) slot using a DIMM connector. In some embodiments, bus 512 can operate to include TDM channels which may, or may not, be synchronized with a TDM fabric within the hwa modules.

In the particular embodiment shown, hwa module 510 can include five offload processors **518-*x*0, however other embodiments containing greater or fewer numbers of processors are contemplated. Offload processors 518-*x*0 can be custom manufactured or a variety of commodity processors including but not limited to field-programmable gate arrays (FPGA), microprocessors, reduced instruction set computers (RISC), microcontrollers or ARM processors. In some embodiments, offload processors 518-*x*0** can include combinations of computational FPGAs such as those based on Altera, Xilinx (e.g., Artix class), or Zynq architecture (e.g., Zynq 7020), and/or conventional processors such as those based on Intel Atom or ARM architecture (e.g., ARM A9).

Offload processors **518-*x*0 can have access to module memories 518-*x*1. Module memories 518-*x*1 can be memories that are dedicated to particular offload processors 518-*x*0, or can be shared memories accessible by multiple, or all offload processors 518-*x*0. In the particular embodiment shown, each offload processor 518-*x*0 can connect to two dedicated module memories. In particular embodiments, offload processors 518-*x*0 can access module memories 518-*x*1** via a TDM fabric.

Module memories **518-*x*1** can be of any suitable type, including but not limited to random access memory (RAM), dynamic random access memory (DRAM), sequential access memory (SAM), static random access memory (SRAM), synchronous dynamic random access memory (SDRAM), reduced latency dynamic random access memory (RLDRAM), flash memory, or other memory standards such as those based on DDR4 or hybrid memory cubes (HMC), as but two examples. Further, embodiments can include mixed memory types. As but one example, one memory can be DRAM while another can be SRAM.

Figure 6A:
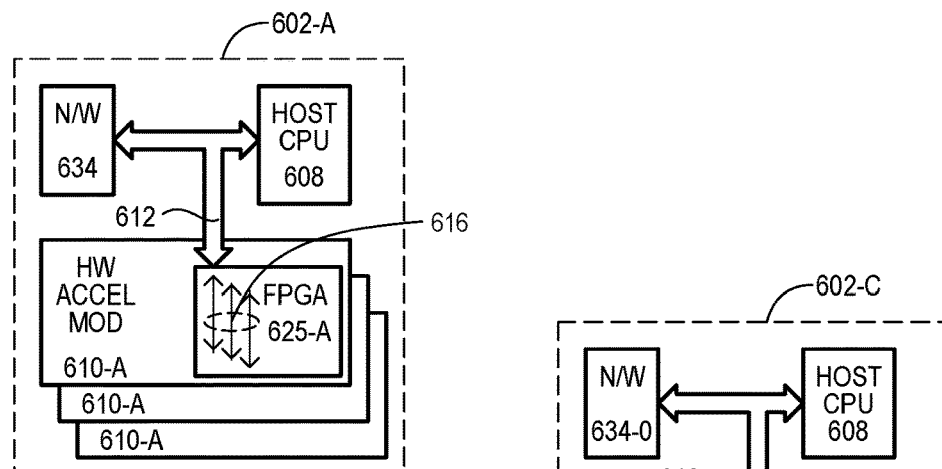
FIGS. 6A to 6C are block schematic diagrams of hwa modules that can be included in embodiments.
Figure 6C:
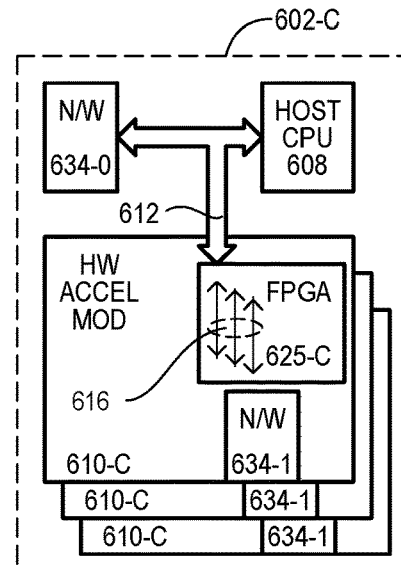
Figure 6B:
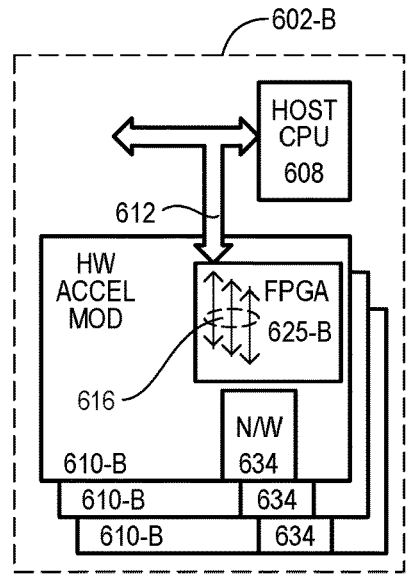

FIGS. 6A to 6C are block diagrams of servers according to embodiments

Referring to FIG. 6A, a server 602-A can include one or more network interfaces 634, one or more hwa modules 610-A, and one or more host processors 608. Network interface 634 can receive network packet data from a network or another computer or virtual machine. In the particular embodiment shown, a network interface 634 can include a network interface card (NIC), or the like. Network interface 634 can be connected to a host processor 608 and hwa module 610-A by one or more buses 612. In some embodiments, buses 612 can include a peripheral component interconnect (PCI) type bus. In very particular embodiments, a network interface 634 can be a NIC PCI and/or PCI express (PCIe) device connected with a PCI bus (included in 612) formed on a circuit board the includes the host processor 608. In particular embodiments, bus 612 can include TDM channels that may, or may not, be synchronized with a TDM fabric of hwa module 610-A (described in more detail below).

A host processor 608 can be any suitable processor device. In particular embodiments, a host processor 608 can include processors with "brawny" cores, such x86 based processors, as but one, non-limiting example.

Hwa module 610-A can be connected to buses 612 of server 602-A in any suitable fashion. In some embodiments, hwa module 610-A can be a circuit board that inserts into a bus socket on a larger circuit board (e.g., mother board) of a server 602-A. As shown In FIG. 6A, a hwa module 610-A can include one or more programmable logic devices (PLDs) 625-A, which in the embodiment shown, are field programmable gate arrays (FPGAs). However, alternate embodiments can include any suitable PLD. PLDs 625-A can include programmable logic circuits, and can, in some embodiments, include one or more fixed function circuits, such as one or more processors or memories, as but two example. PLDs 625-A can also include circuits, or be connected to circuits, which can access data stored in a buffer memories (not shown) of the hwa module 610-A. Such various circuits can serve as computing elements as described herein, or equivalents.

In some embodiments, PLDs 625-A can be configured to provide a TDM fabric 616 for accessing computing elements on the hwa module 610-A. This can include receiving network packet data from buses 612, and placing such packet data in one or more TDM slots, based on data for the packet.

FIG. 6B is a block diagram of another server 602-B that can be included in embodiments. Server 602-B can include items like those of FIG. 6A, and be subject to the same variations. Server 602-B differs from that of FIG. 6A in that network interface 634 can be formed on the hwa module 610-B. In such an arrangement, PLDs 625-B can be configured to receive network packet data from network interface 634, and process such via fabric 616 (which can be a TDM fabric) in any of various ways described herein. In addition, PLDs 625-B can enable packet data to be forwarded to host processor 608 (or a system memory accessible by host processor) for processing. Once processed, processed data from host processor 608 can be output, via buses 612, to hwa module 610-B. Processed data can be output from hwa module 610-A over network interface 634.

FIG. 6C is a block diagram of another server 602-C that can be included in embodiments. Server 602-C can include items like those of FIG. 6A, and can be subject to the same variations. Server 602-C differs from that of FIG. 6A in that it can have a bus network interface 634-0 as in FIG. 6A, as well as an hwa module network interface 634-1. Accordingly, server 602-C can receive, process, and transmit packet data as described for FIGS. 6A and 6B.

Figure 7:
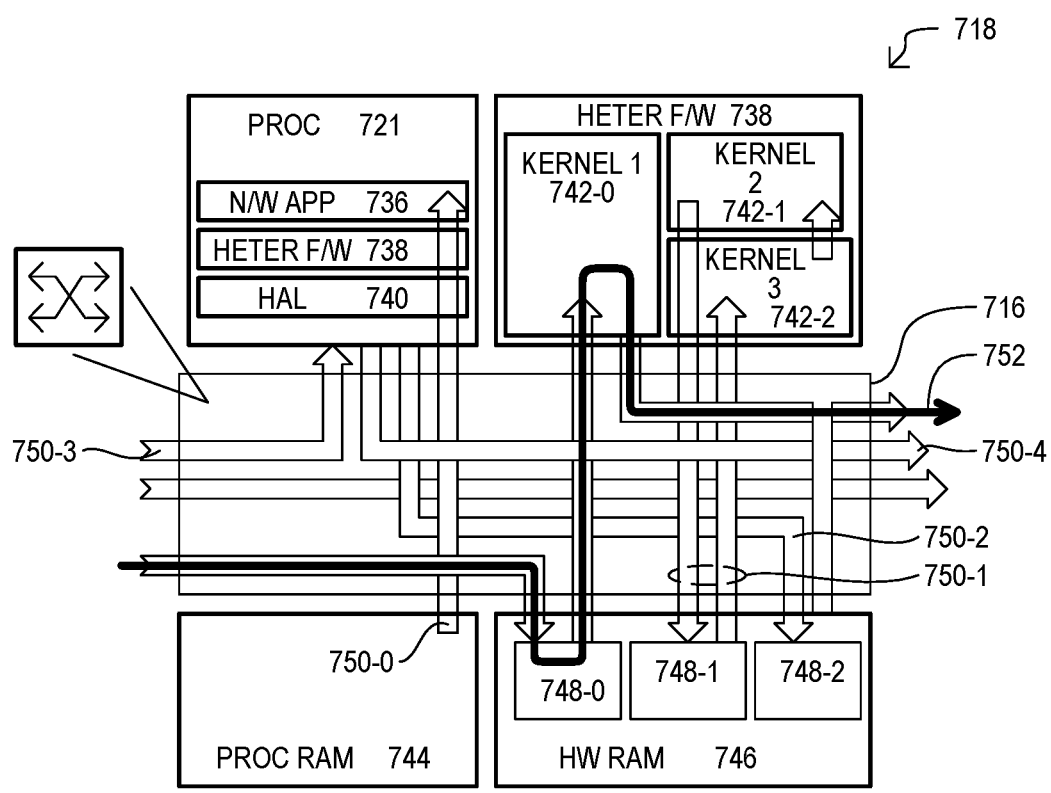
FIG. 7 is a block diagram of a computing element according to embodiments.

FIG. 7 is a block diagram of a computation element 718 according to an embodiment. A computation element 718 can be included in an hwa module, as described for embodiments herein, and can execute computation operations over a shared TDM fabric. A computation element 718 can include one or more processing circuits 721, a first memory 744, second memory 746, and data transfer fabric 716.

Processing circuits 721 can be configured to run a program 736 for a networked application. Program 736 can be written on a framework 738 for execution across heterogenous platforms to enable program 736 to utilize or access various components of an hwa module (or larger system) as described herein (e.g., processing circuits, memories, programmable logic devices, or any other suitable circuit). In the embodiment shown, processing circuits 721 can be further configured with a hardware abstraction layer (HAL) to enable use of various (e.g., heterogenous) components.

In some embodiments, processing circuits 721 can include one or more processor cores. In some embodiments, processing circuits 721 can include processors that consume less power than a host processor of server system. As but one particular example, processing circuits 721 can include an ARM type processor. Such a processor can be a separate integrated circuit, or can be integrated with other circuits (e.g., programmable logic). However, processing circuits 721 can take the form of any suitable processing circuit for a given application, including but not limited to: microcontroller or custom logic (including logic derived from fixed circuits, programmable circuits, or combinations thereof).

A program 736 can be any suitable program, but in particular embodiments can be part of a machine learning library, such as TensorFlow as but one very particular embodiment, to enable machine learning applications to run across multiple computing elements on multiple networked servers. According to embodiments, framework 738 can enable various execution processes 742-0 to -2 to perform computation actions called by a program 736. It is understood that execution processes (724-0 to -2) can be performed by processing circuits 721, or by any other suitable circuit (e.g., heterogenous hardware elements) of compute element 718. A framework 738 can be any suitable framework, but can be OpenCL in a very particular embodiment, with execution processes 742-0 to -2 being different OpenCL kernels.

First memory 744 can be a memory accessed by processing circuits 721. In some embodiments, programs can be loaded into first memory 744 for execution by processing circuits 721. First memory 744 can be situated on a hwa module that contains compute element 718. In a very particular embodiment, first memory 744 can be a volatile memory, such a synchronous dynamic random access memory (SDRAM). In some embodiments, processing circuits 721 can access first memory 744 through data transfer fabric 716 (path shown as 750-0).

Second memory 746 can be memory accessed by various heterogenous computing circuits of compute element 718. In very particular embodiments, second memory 746 can be relatively fast memory accessible by programmable logic (FPGA), such as static RAM (SRAM).

Second memory 746 can have predetermined memory spaces (examples shown as 748-0 to -2) accessible by different components, including those on the computing element 718, as well as components remote from the computing element (not shown in FIG. 7). As such, memory spaces (748-0 to -2) can serve to provide connections between such components, serving as data sources and sinks. Such an arrangement can give rise to any of numerous connections. Further, because a data transfer fabric 716 can be programmable (as will be described in more detail below), connections are configurable. FIG. 7 shows, by way of example only, various possible connections including: a heterogenous process to heterogenous process (e.g., kernel-to-kernel) 750-1 and processor-to-kernel 750-2.

A data transfer fabric 716 can provide data transfer paths between components of a compute element 718. Such data paths can include, but are not limited to, connections between any or all of: processing circuits 721, first memory 744, second memory 746, and processes executed by heterogenous components (e.g., 742-0 to -2). In addition, fabric 716 can provide connection into, out of, and through compute element 718. As but two of many possible examples, FIG. 7 shows connection 750-3 into compute element 718 to processing circuits 721 (however input connection can be to any component/process) and connection 750-4 from processing circuits 721 out of compute element 718 (however output connection can be from any component/process).

In some embodiments, data transfer fabric 716 can be a TDM fabric having time slots that can be reserved for actions.

In some embodiments, a fabric 716 can be programmable, providing connections as needed. In the case of a TDM fabric, such programmability can enable time slots to be configured as needed, including dedicating fewer or greater numbers of time slots for actions.

In particular embodiments, fabric 716 can be formed by buses on a programmable logic device, such as an FPGA. In a very particular embodiment, a compute element can include a computational FPGA having programmable logic and one or more embedded processors. As but one example, processing circuits 721 can be an ARM processors embedded with programmable to control switch fabric 716, and second memory 746 can be embedded SRAM. However, alternate embodiments can include non-integrated solutions, with any or all of the above components being provided in a different package.

A fabric 716 can be configured as a TDM fabric to enable processing pipelines to be constructed where data can be transferred and processed through compute element 718. Once configured, a processing pipeline can autonomously flow through a heterogenous framework (e.g., OpenCL) (one example shown as 752).

In one particular embodiment, a compute element 718 can be a single integrated circuit device, such as a computational FPGA.

Figure 8:
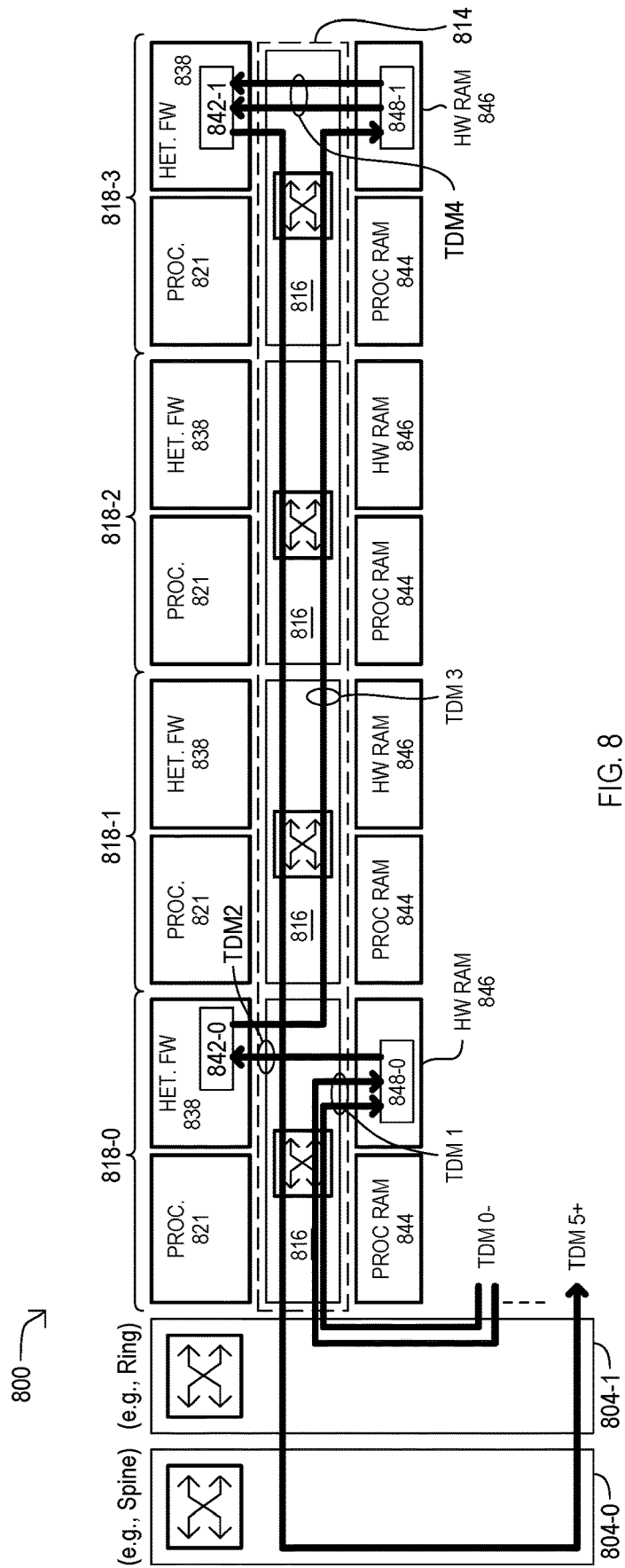
FIG. 8 is a block diagram of a system according to an embodiment.

As noted above, according to embodiments, data transfer fabrics of multiple computing elements can be linked together to form pipelines of essentially arbitrary size. Such a linking of computing elements can occur on a same hwa module, between hwa modules on a same server, or between hwa modules on different servers. Further, because computing can include programmable devices for establishing the fabrics, such linking can be reconfigured as needed for different applications. FIG. 8 shows one example of a system that links computing modules.

FIG. 8 is a block diagram of a system 800 that includes computing elements (818-0 to -3), a first connection layer 804-0 and a second connection layer 804-1. Computing elements (818-0 to -3) can take the form of those shown in FIG. 7, or any equivalent. FIG. 8 shows an arrangement in which fabrics 816 of computing elements are interconnected to form a larger fabric 814. According to embodiments, larger, inter-element fabric 814 can present a shared fabric to multiplex access among all computing elements (818-0 to -3). In some embodiments, inter-element fabric 814 can be a shared TDM fabric with reservable, programmable timing slots to enable pipelining into and out of any or all of the computing elements (818-0 to -3).

According to embodiments, computing elements (818-0 to -3) can be formed on a same hwa module, on different hwa modules of a same server, or both. For elements on a same hwa module, inter-element fabric 814 can include a bus on the module that interconnects computing elements (818-0 to -3), which can be groups of integrated circuits in separate packages, grouped into one or more packages, or a single integrated circuit. For elements on different hwa modules, inter-element fabric 814 can include a bus that interconnects hwa modules. As but one example, such an inter-element fabric can include a bus on a main board or motherboard of a server. In very particular embodiments, such an inter-element fabric can include a PCI or memory (e.g., DDR) type bus.

Referring still to FIG. 8, computing elements (818-0 to -3) can be connected to other parts of a system, including other computing elements, over one or more connection layers. In the particular embodiment shown, system 800 can include a first connection layer 804-0 that can serve to connect computing elements on a same appliance (e.g., between hwa modules of a same server or other device).

A first connection layer 804-0 can provide communication according to any suitable protocol for the connection structure. In some embodiments, first connection layer 804-0 can include a bus formed on a main board or motherboard of a device that can connect hwa modules to one another, where such hwa modules each include one or more computing elements (e.g., 818-0 to -3). In very particular embodiments, such a bus can include any system bus, including a PCI type bus or memory bus (e.g., DDR type), as two or numerous possible examples. In addition or alternatively, first connection 804-0 can include inter-module connections that include network interface devices, including direct inter-module connections, or indirect module connections that pass through one or more switching devices.

A second connection layer 804-1 can provide communication over a larger distributed system, connecting computing elements (e.g., 818-0 to -3) to other devices (e.g., separate appliances/servers) located locally (same data center) or remotely (e.g., other side of the world). In a particular embodiment, a second connection layer 804-1 can include a "spine" portion of a network. However, alternate embodiments can include any other suitable layer, both higher or lower in a topology (e.g., core, leaf, aggregation, etc.).

Referring still to FIG. 8, one particular pipelined operation, shown in bold lines, will be described. The example operation assumes an inter-element fabric 814 is a TDM fabric. In the operation shown, stages in a pipelined operation are shown as "TDM x", where x represents a particular stage in a pipelined operation. At stages TDM 0-1 (and/or any preceding stages), two TDM slots can be used to connect to a memory space 848-0 in second memory 846 of computing element 818-0 (and store data therein). At stage TDM 2, data in memory space 848-0 can be read out by execution process (e.g., kernel) 842-0 of computing element 818-0. At stage TDM 3, a result from execution process 842-0 can be stored at memory space 848-1 in second memory 846 of computing element 818-3. At stage TDM 4, execution process 842-1 can read data from memory space 848-1. At stage TDM 5 (and beyond), a result of execution process 842-1 can then be sent via switching layers 804-1 and 804-0 to another location (e.g., another appliance with computing elements connected by an intermodule fabric).

It is understood that execution processes 842-0/1 can represent pipelined actions of a same overall process. As but one of many possible examples, execution processes 842-0/1 can operate according to a same network application (e.g., 736 in FIG. 7). It is also understood that in some embodiments, computing elements 818-0 to 818-3 can form part of a same appliance, and can be interconnected via switching layers 804-1 and/or 804-0/1 with another like appliance. Further, such appliances can be added (physically or logically) to scale out a computing pipeline as needed/desired. Further, as described herein, in particular embodiments computing elements (e.g., 818-0 to 818-3) can be connected by a very high speed physical bus (e.g., memory bus, system bus) for high speed connectivity among such computing elements.

Figure 9:
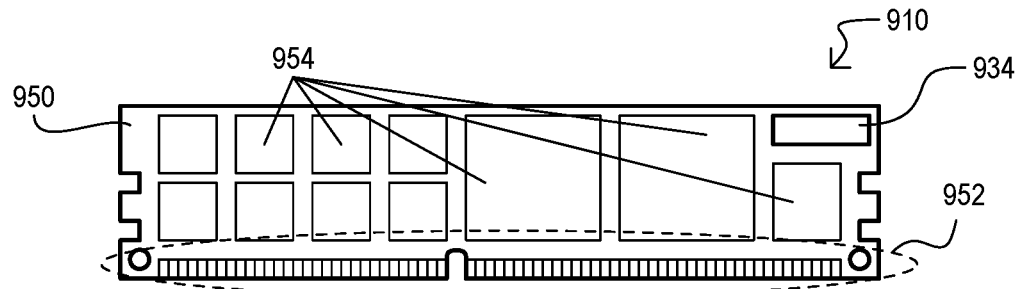
FIG. 9 is a diagram of an hwa module that can be included in embodiments.

FIG. 9 is a diagram of an hwa module 910 according to one particular embodiment. A hwa module 910 can include a printed circuit board 950 having a physical interface 952. Physical interface 952 can enable hwa module 910 to be inserted into a bus connection slot on a server board. Mounted on the hwa module 910 can be circuit components 954, which can include programmable logic devices, including one or more FPGA devices. In addition or alternatively, circuit components 954 can include any of: memory, including both volatile and nonvolatile memory; a programmable switch (e.g., network switch); and/or one or more processor cores. Such circuit components can form one or more computing elements, such as those shown in FIGS. 7 and 8, or equivalents.

In some embodiments, hwa module 910 can connect with other hwa modules via a bus commonly connected to physical interface 952. Such an arrangement can enable pipelines of computing elements to be formed.

In addition, hwa module 910 can include one or more network I/Fs 934. A network I/F 934 can enable a physical connection to a network. In some embodiments, this can include a wired network connection compatible with IEEE 802 and related standards. However, in other embodiments, a network I/F 934 can be any other suitable wired connection and/or a wireless connection. Network I/F 934 can enable computing elements of the hwa module 910 to connect with other computing elements, including those on other like modules, to form processing pipelines.

Figure 10:
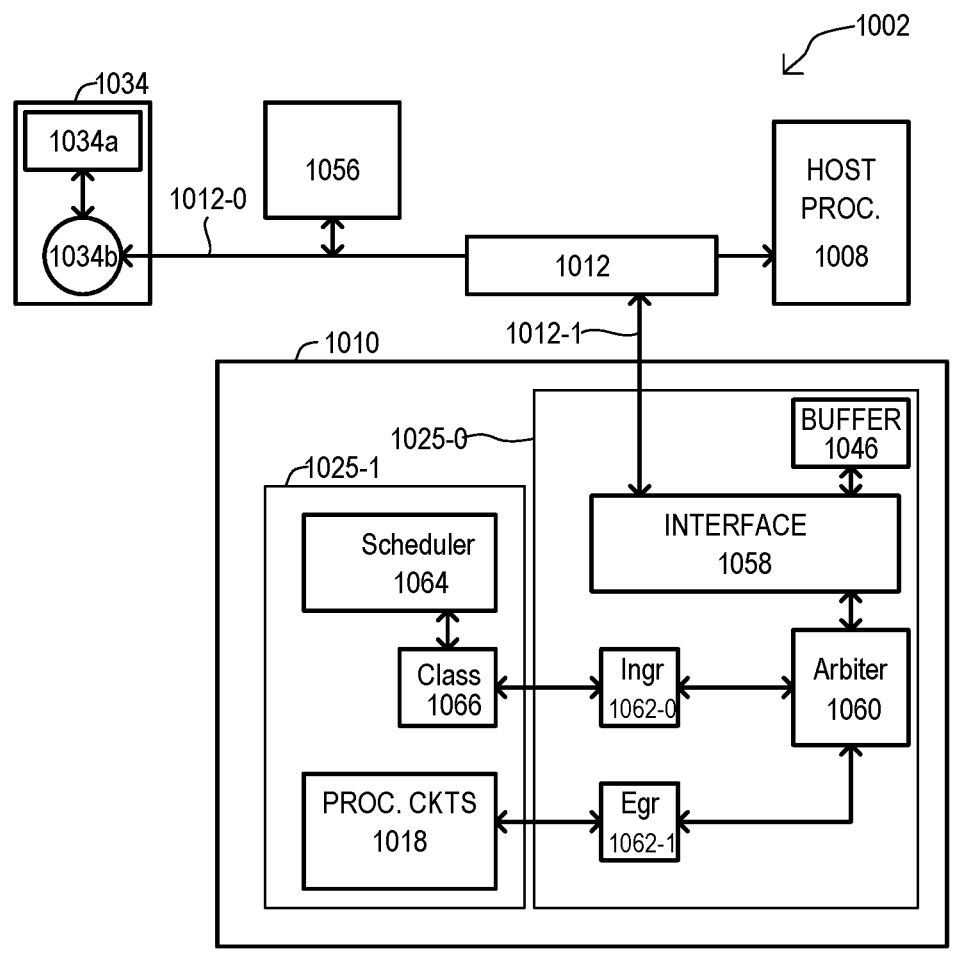
FIG. 10 is a block diagram of hwa module according to one particular embodiment.

Referring now to FIG. 10, a hardware accelerated server 1002 according to one particular embodiment is shown in a block diagram. A hardware accelerated server 1002 can include a network I/F 1034, a bus system 1012, a host processor 1008, and a hwa module 1010. A network I/F 1034 can receive packet or other I/O data from an external source. In some embodiments, network I/F 1034 can include physical or virtual functions to receive a packet or other I/O data from a network or another computer or virtual machine. A network I/F 1034 can include, but is not limited to, PCI and/or PCIe devices connecting with a server motherboard via PCI or PCIe bus (e.g., 1012-0). Examples of network I/Fs 1034 can include, but are not limited to, a NIC, a host bus adapter, a converged network adapter, or an ATM network interface.

In some embodiments, a hardware accelerated server 1002 can employ an abstraction scheme that allows multiple logical entities to access the same network I/F 1034. In such an arrangement, a network I/F 1034 can be virtualized to provide for multiple virtual devices, each of which can perform some of the functions of a physical network I/F. Such 10 virtualization can redirect network packet traffic to different addresses of the hardware accelerated server 1002.

In the very particular embodiment shown, a network I/F 1034 can include a NIC having input buffer 1034a and in some embodiments, an I/O virtualization function 1034b. While a network I/F 1034 can be configured to trigger host processor interrupts in response to incoming packets, in some embodiments, such interrupts can be disabled, thereby reducing processing overhead for a host processor 1010.

In some embodiments, a hardware accelerated server 1002 can also include an I/O management unit 1056 which can translate virtual addresses to corresponding physical addresses of the server 1002. This can enable data to be transferred between various components the hardware accelerated server 1002.

A host processor 1008 can perform certain processing tasks on network packet data, however, as noted herein, other network packet data processing tasks can be performed by hwa module 1010 independent of host processor 1008. In some embodiments, a host processor 1008 can be a "brawny core" type processor (e.g., an x86 or any other processor capable of handling "heavy touch" computational operations). More particularly, host processor 1008 can execute in-memory processing of data as a mapper and/or reducer.

An hwa module 1010 can interface with a server bus 1012-1 via a standard module connection. A server bus 1012-1 can be any suitable bus, including a PCI type bus, but other embodiments can include any suitable memory bus. An hwa module 1010 can be implemented with one or more programmable logic devices (referred to as FPGAs, but not necessarily being limited to such devices) 1025-0/1. In the embodiment of FIG. 10, hwa module 1010 can include FPGA(s) 1025-0/1 in which can be formed any of the following: a host bus interface 1058, an arbiter 1060, a scheduler circuit 1064, a classifier circuit 1066, and/or processing circuits 1018.

A host bus interface 1058 can be connected to server bus 1012-1 and can be capable of block data transfers over server bus 1012-1. Packets can be queued in a memory 1046. Memory 1046 can be any suitable memory, including volatile and/or nonvolatile memory devices, where such memory can be separate from and/or integrated with FGPA(s) 1025-0/1.

An arbiter 1060 can provide access to resources (e.g., processing circuits 1018) on the hwa module 1010 to one or more requestors. If multiple requestors request access, an arbiter 1060 can determine which requestor becomes the accessor and can then pass data from the accessor to the resource, and the resource can begin executing processing on the data. After such data has been transferred to a resource, and the resource has competed execution, an arbiter 1060 can transfer control to a different requestor and this cycle can repeat for all available requestors. In the embodiment of FIG. 10, arbiter 1060 can notify other portions of hwa module 1010 of incoming data. Arbiter 1060 can input and output data via data ingress path 1062-0 and data egress path 1062-1.

In some embodiments, a scheduler circuit 1064 can perform traffic management on incoming packets by categorizing them according to flow using session metadata. Packets from a certain source, relating to a certain traffic class, pertaining to a specific application, or flowing to a certain socket, are referred to as part of a session flow and can be classified using session metadata. In some embodiments, such classification can be performed by classifier circuit 1066. Packets can be queued for output in memory (e.g., 1046) based on session priority.

In particular embodiments, a scheduler circuit 1064 can allocate a priority to each of many output queues (e.g., in 1046) and carry out reordering of incoming packets to maintain persistence of session flows in these queues. A scheduler circuit 1064 can be configured to control the scheduling of each of these persistent sessions in processing circuits 1018. Packets of a particular session flow can belong to a particular queue. A scheduler circuit 1064 can control the prioritization of these queues such that they are arbitrated for handling by a processing resource (e.g., processing circuits 1018) located downstream. Processing circuits 1018 can be configured to allocate execution resources to a particular queue. Embodiments contemplate multiple sessions running on a processing circuits 1018, with portions of processing circuits 1018 each handling data from a particular session flow resident in a queue established by the scheduler circuit 1064, to tightly integrate the scheduler circuit 1064 and its downstream resources (e.g., 1018). This can bring about persistence of session information across the traffic management and scheduling circuit 1064 and processing circuits 1018.

Processing circuits 1018 can be capable of processing packet data. In particular embodiments, processing circuit 1018 can be capable of handling packets of different application or transport sessions. According to some embodiments, processing circuits 1018 can provide dedicated computing resources for handling, processing and/or terminating session flows. Processing circuits 1018 can include any suitable circuits of the FPGA(s) 1025-0/1. However, in some embodiments, processing circuits 1018 can include processors, including CPU type processors. In particular embodiments, processing circuits 1018 can include low power processors capable of executing general purpose instructions, including but not limited to: ARM, ARC, Tensilica, MIPS, StrongARM or any other suitable processor that serve the functions described herein. In operation, a hardware accelerated server 1002 can receive network data packets from a communications network. Based on their classification, the packets can be destined for a host processor 1008 or processing circuits 1018 on hwa module 1010. The network data packets can have certain characteristics, including transport protocol number, source and destination port numbers, source and destination IP addresses, for example. In some embodiments, the network data packets can further have metadata that helps in their classification and/or management.

In particular embodiments, processing circuits 1018 can be configured to form all or part of a computing elements as described with reference to FIGS. 7 and 8.

In some embodiments, any of multiple devices of the hardware accelerated server 1002 can be used to redirect traffic to specific addresses. Such network data packets can be transferred to addresses where they can be handled by one or more processing circuits (e.g., 1018). In particular embodiments, such transfers on the hardware accelerator server 1002 can be to physical addresses, thus logical entities can be removed from the processing, and a host processor 1008 can be free from such packet handling. Accordingly, embodiments can be conceptualized as providing a "black box" to which specific network data can be fed for processing.

As noted above, in some embodiments, session metadata can serve as the criteria by which packets are prioritized and scheduled and as such, incoming packets can be reordered based on their session metadata. This reordering of packets can occur in one or more buffers (e.g., 1046) and can modify the traffic shape of these flows. The scheduling discipline chosen for this prioritization, or traffic management, can affect the traffic shape of flows and micro-flows through delay (buffering), bursting of traffic (buffering and bursting), smoothing of traffic (buffering and rate-limiting flows), dropping traffic (choosing data to discard so as to avoid exhausting the buffer), delay jitter (temporally shifting cells of a flow by different amounts) and by not admitting a connection (e.g., cannot simultaneously guarantee existing service level agreements (SLAs) with an additional flow's SLA).

As noted above, according to embodiments, an hwa module 1010 can serve as part of a switch fabric, and provide traffic management with output queues (e.g., in 1046), the access to which is arbitrated by a scheduling circuit 1064. Such output queues can be managed using a scheduling that provides traffic management for incoming flows. The session flows queued in each of these queues can be sent out through an output port to a downstream network element.

While embodiments can include server systems and methods with hardware accelerator nodes, alternate embodiments can include such systems executing particular processing operations. Such embodiments will now be described.

Conventional data intensive computing platforms for handling large volumes of unstructured data can use a parallel computing approach combining multiple processors and disks in large commodity computing clusters connected with high-speed communications switches and networks. This can allow the data to be partitioned among the available computing resources and processed independently to achieve performance and scalability based on the amount of data. A variety of distributed architectures have been developed for data-intensive computing and several software frameworks have been proposed to process unstructured data. One such programming model for processing large data sets with a parallel, distributed algorithm on a multiple servers or clusters is commonly known as map,reduce (i.e., MapReduce). Apache Hadoop is a popular open-source implementation of MapReduce that is widely used by enterprises for the searching of unstructured data.

Figure 11:
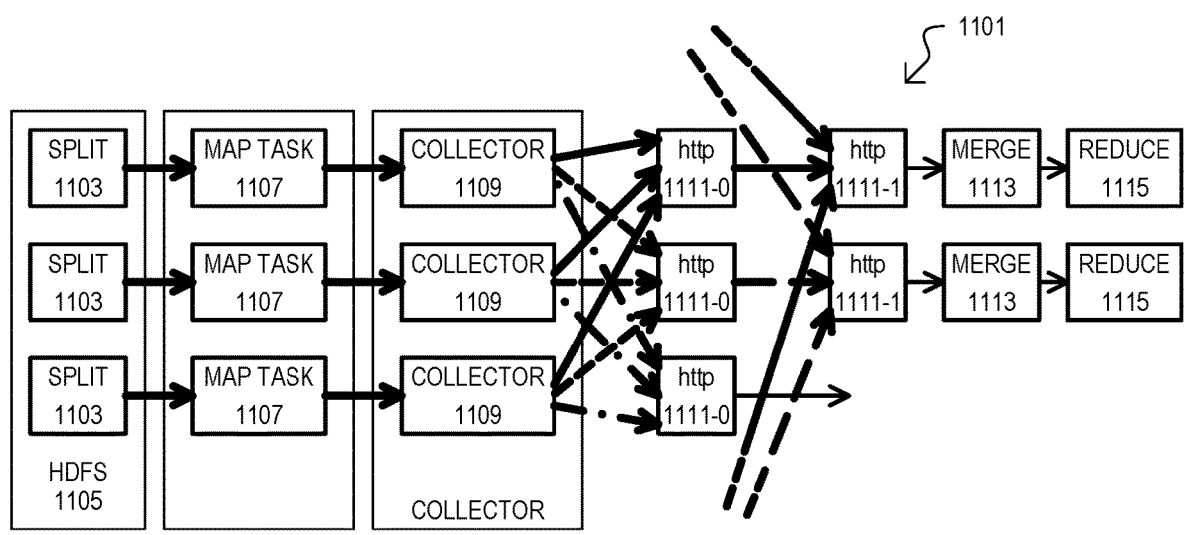
FIG. 11 is a block diagram of a conventional data processing system.

FIG. 11 is a block diagram showing a conventional Apache Hadoop type data processing system 1101 (for executing map,reduce type processing). System 1101 can include a Hadoop file system 1105 that can contain data splits 1103 for processing. Data splits 1103 can be processed by mappers 1107. Mappers 1107 can process data splits to generate key,value pairs (tuples). Collectors 1109 operate with http services (1111-0, 1111-1) to create a large, logical crossbar between each mapper 1107 and each reducer 1115. Processed data value for reducers can be received at an appropriate merge destination 1113. In a conventional system 1101, nodes executing the mapping, merging and reducing can be servers operating with disk storage devices, such as magnetic disks or solid state disks.

In conventional system 1101, data spills to disk are almost unavailable. This slows performance and such spilled data needs to be read back into server memory to continue processing. Further, increases in performance of a system 1101 can require non-linear growth in spine bandwidth and increases in system complexity. Still further, it can be very difficult to combine jobs between private and public data centers, as wide area network (WAN) bandwidth and spine bandwidth diverge.

It would be desirable to arrive at some way of increasing the performance of a systems for processing unstructured data that do not suffer from the drawbacks of conventional approaches.

Embodiments can include systems and methods that can perform data processing, including "big" data processing, by accelerating processing tasks with networked hardware accelerator (hwa) modules included in server systems.

In some embodiments, hwa modules can accelerate one or more data redistribution steps by streaming data over a network from one computing device to any one of many other computing devices.

In very particular embodiments, hwa modules can accelerate a shuffle step in networked system configured into a map,reduce type framework.

Figure 12:
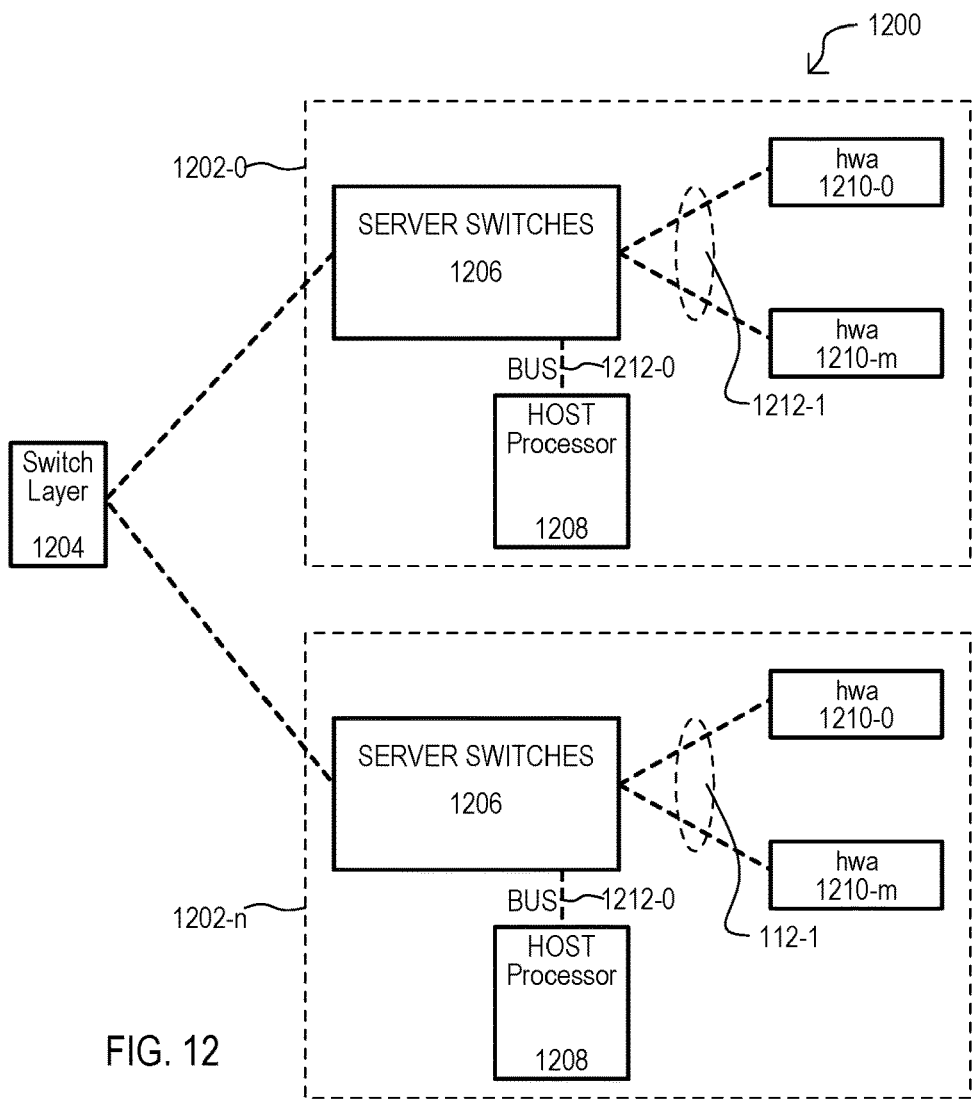
FIG. 12 is a block diagram of a system according to an embodiment.

FIG. 12 is a block diagram of a system 1200 according to an embodiment. A system 1200 can include a number of servers 1202-0 to 1202-*n*, which can be networked together by own or more switching layers 1204. A switching layer 1204 can include an access pathway to other networks, including other systems, such as a LAN, WAN or the Internet, as but a few examples.

Each server (1202-0 to -*n*) can include server switch(es) 1206, one or more host processors 1208, and one or more hwa modules 1210-0 to -*m*. Server switches 1206 can be connected to host processor 1208 and hwa modules (1210-0 to -*m*) by one or more buses 1212-0/1. Buses 1212-0/1 can be any suitable bus, including but not limited to a system bus (e.g., PCI, PCIe etc.) and/or memory bus (e.g., various generations of DDR, Hybrid Memory Cube, High Bandwidth Memory, etc.). Server switches 1206 can include one or more network switches that enable packet data to be switched between switch layer 1204, host processor 1208, and hwa modules 1210-0 to -*m*. Server switches 1206 can be connected host processor 1208 and hwa modules (1210-0 to -*m*).

In particular embodiments, servers (1202-0 to -*n*) can include memory mapping configured to access hwa modules (1210-0 to -*m*). In a very particular embodiment, a mmap routine can be modified to execute code corresponding to a driver for an hwa module (1210-0 to -*m*). However, such a particular implementation should not be construed as limiting.

In operation, servers (1202-0 to -*n*) can receive packet data representing processing results from various other nodes of a larger system. Data within such packets can be processed by operation of hwa modules (1210-0 to -*m*) and/or host processor 1208. Hwa modules (1210-0 to -*m*) can process data independent of host processor 1208 to accelerate the processing of data. Processed data can be output from the server (1202-0 to -*n*). Packet data can be received and transmitted according to any suitable protocol, including layer 2 or layer 3 protocols, as well as via a vpn overlaying the system.

Figure 13:
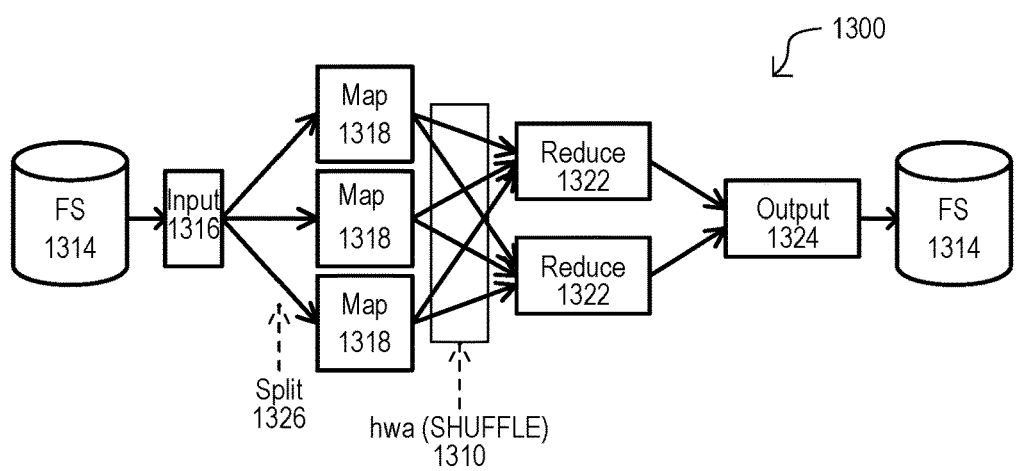
FIG. 13 is a diagram of a system and data processing flow according to another embodiment.

FIG. 13 shows is a diagram of a system 1300 according to another embodiment. A system 1300 can have a distributed architecture for implementing multi-stage data processing, with one or more data gathering steps. In a particular embodiment, system 1300 can be one example of that shown in FIG. 12. In some embodiments, the workflow can implement a map,reduce processing, such as Apache Hadoop, as but one very particular example.

A system 1300 can include a file system 1314, a partitioning operation 1316, first processing nodes 1318, networked hwa modules 1310, second processing nodes 1322, and an output operation 1324. A file system 1314 can store data to be processed, as well as the end results of processed data. A partitioning operation 1316 can partition large amounts of data into groups of data for processing (e.g., splits 1326).

First processing nodes 1318 can perform a same type of processing, in parallel, on received data sets. Such processing can generate data values that can be reorganized according to processing results from first processing nodes 1318. In some embodiments, first processing nodes 1318 can execute mapping operations in a map,reduce type operation. As such, mapping nodes 1318 can generate data tuples formed of key, value pairs. In very particular embodiments, first processing nodes 1318 can be mappers in a Hadoop type architecture.

Networked hwa modules 1310 can be a group of hwa modules, as described herein or equivalents, networked together and to first processing nodes 1318 and second processing nodes 1322. Networked hwa modules 1310 can receive processing results from first processing nodes 1318 and forward them to selected second processing nodes 1322. In some embodiments, hwa modules 1310 can forward data from first nodes 1318 based on the processing results from the first nodes. In a particular embodiment, hwa modules 1310 can execute a shuffle operation of a map,reduce type operation, sending data from mappers (e.g., 1318) to a particular reducer (e.g., 1322) based on the key value of the processed data. Thus, in such an embodiment, tuples can be gathered based on their values. According to embodiments, hwa modules 1310 can stream processing results to second nodes 1322. That is, all or nearly all results from first nodes 1318 are not spilled to disk, but rather sent as packet data to second nodes 1322. A stream of processing results can include the transmission of a sequence of processing results over time. In particular embodiments, it can include sequential processing results divided into different data packets.

Second nodes 1322 can further process data received from hwa modules 1310. In some embodiments, second processing nodes 1322 can execute reduce operations in a map,reduce type framework. In very particular embodiments, second processing nodes 1322 can be reducers in a Hadoop type architecture. In map,reduce architectures, reducers (e.g., 1322) can generate smaller sets of tuples from sets of tuples gathered by the shuffle operation. An optional output operation 1324 can organize processing results from second nodes 1322 for storage in file system 1314.

Figure 14:
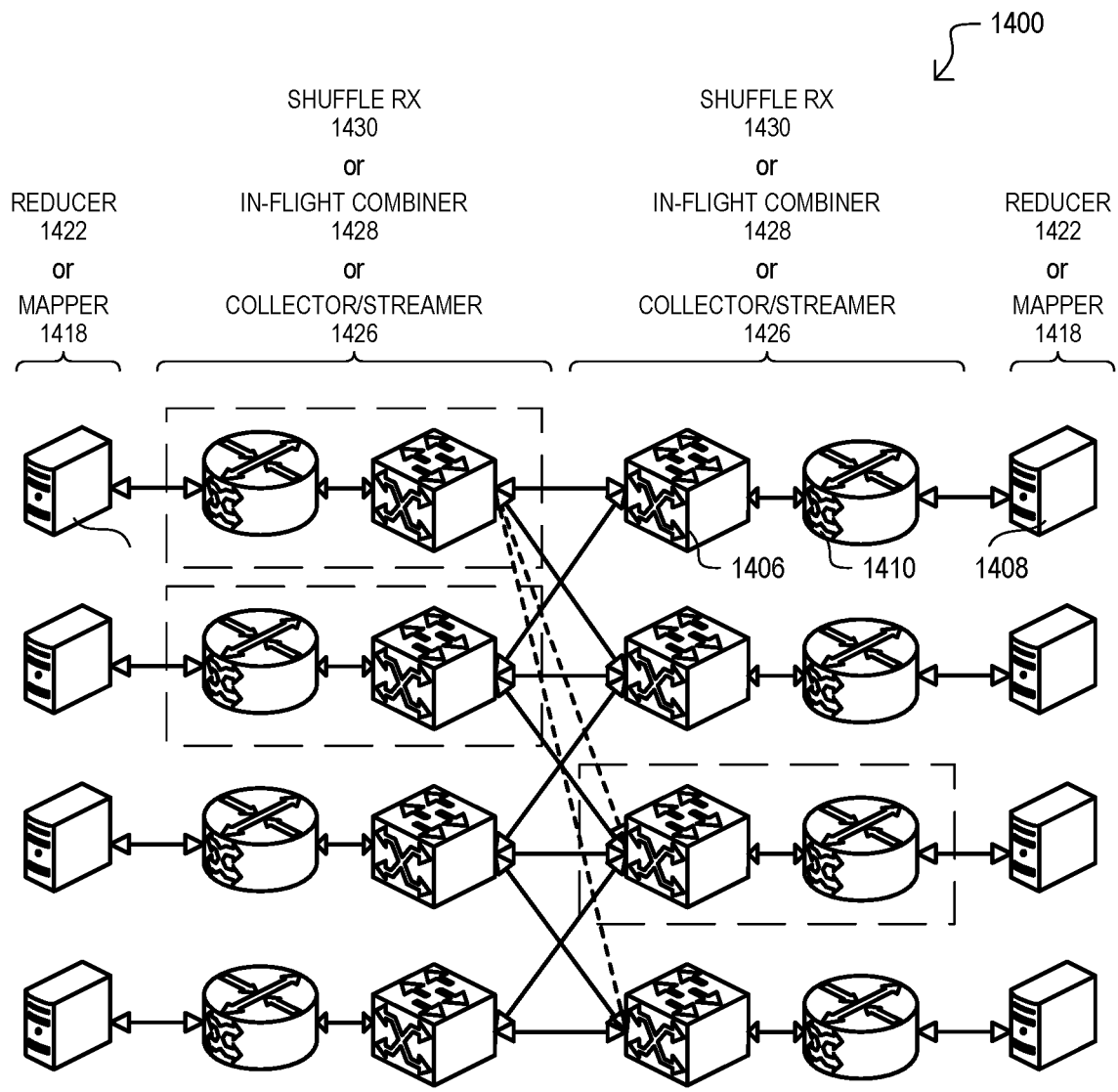
FIG. 14 is a diagram of a system according to another embodiment.

FIG. 14 shows a system 1400 according to another embodiment. A system 1400 can include a midplane switch architecture and include host processors (one shown as 1408), hwa modules (one shown as 1410) and switches (one shown as 1406). According to embodiments, a system 1400 can be configured as one implementation of that shown in FIG. 13.

Host processors 1408 can be mappers 1418 and/or reducers 1422. Mappers 1418 can take any suitable form, executing mapping operations on "splits" of data. In particular embodiments, mappers 1418 can be Hadoop type mappers. Reducers 1422 can take any suitable form. In some embodiments, reducers 1422 can be conventional Hadoop type reducers. However, in other embodiments, reducers 1422 can operate in conjunction with a shuffle receiver, as described in more detail below.

Hwa modules 1410 and switches 1406 can be any of: a collector-streamer 1426, combiner 1428 or shuffle receiver (rx) 1430. A collector-streamer 1426 can collect map results from mappers 1418, and stream them to combiners 1428 based on the processed data value. However, collector-streamers 1426 can also be implemented by host processors 1408.

Combiners 1428 can combine various values streamed to them by collector-streamers 1426. Such an action can effectively "shuffle" like values (e.g., key matching) to a combiner 1428. Combiners 1428 can be implemented by hwa modules, thus combining can occur at a very high speed. Accordingly, combiners 1428 can be conceptualized as "in-flight" combiners, as data are combined by combiners 1428 as they are transmitted to the appropriate reducer 1422. Shuffle rxs 1430 can organize shuffled data for reducing by reducers 1422.

Hwa modules 1410 can be mounted in server units that include host processors 1408. Switches 1406 can be virtual switches implemented by circuits in hwa modules 1410, that can receive and forward network packets representing processing results. Such circuits can include processors, programmable logic, or combinations thereof. In addition or alternatively, switches can be external to the hwa module but located in the server (e.g., a network interface card, or the like). Hwa modules 1410 can take the form of any of those shown herein, or equivalents.

In some embodiments, hwa modules 1410 can be mounted in server modules by attachment to buses therein. In very particular embodiments hwa modules 1410 can be mounted in memory sockets (e.g., DIMM sockets) of a server unit. In other embodiments, hwa modules 1410 can be mounted in other system bus sockets (e.g., PCI, PCIe). Ingress packets to collector-streamers can be examined by hwa modules 1410. Such examination can include inspection of the data packets to determine to which combiner 1428 the data will be streamed to.

Figure 15:
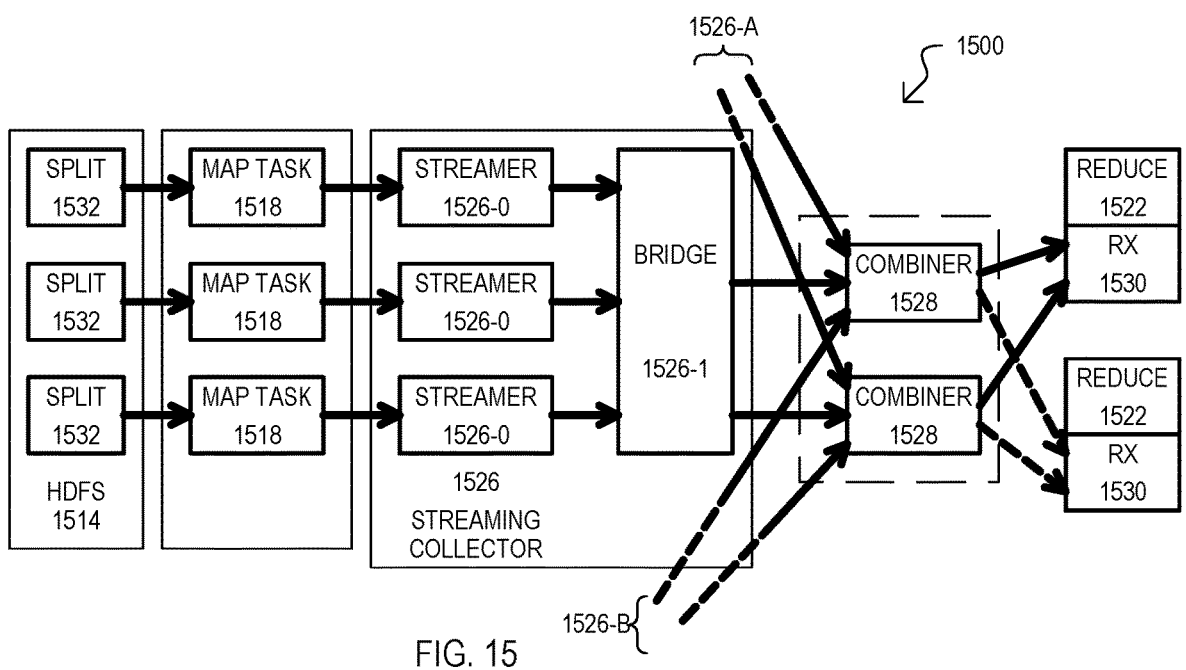
FIG. 15 is a diagram of a system according to a further embodiment.

FIG. 15 is a diagram of another system 1500 according to an embodiment. In some embodiments, a system 1500 can be one implementation of that shown in FIG. 13. System 1500 can provide map,reduce type processing, without data skew and/or spills to disk that can occur in conventional architectures. In a very particular embodiment, a system 1500 can be created by adding and configuring hwa modules into an existing map,reduce framework. That is, system 1500 can be a plug-in solution for existing systems (e.g., Hadoop) to accelerate performance.

A system 1500 can include a file system 1514, mappers 1518, a streaming collector sub-system 1526, in-flight combiners 1528, shuffle rxs 1530, and reducers 1522. A file system 1514 can provide data for processing that has been divided into groups 1532. In particular embodiments, file system 1526 can be a Hadoop file system (hdfs) that can provide data splits for processing by mappers 1518. Mappers 1518 can generate mapper outputs according to a given map,reduce operation. In particular embodiments, mappers 1518 can be Hadoop type mappers. In some embodiments, mappers 1518 can be server systems with mapper instructions executed by a host processor.

Output data from mappers can be received by a streaming collector subsystem 1526. Subsystem 1526 can include streamers 1526-0 and bridge 1526-1. In the embodiment shown, each streamer 1526-0 can receive data processed by a corresponding mapper 1518. Such data can be forwarded to bridge 1526-1, which can identify an appropriate combiner 1528. As understood from FIG. 15, combiner 1528 can receive processed data from various other streaming collector subsystems 1526-A/B over a network connection. Other streaming collector subsystems 1526-A/B can be part of other systems processing other data splits.

Combiners 1528 can combine received data values to provide data values redistributed based on processing results. In particular embodiments, combiners 1528 can provide outputs of tuples with like key values, as in a conventional map,reduce operation. However, according to embodiments, combiners 1528 can operate at very high speeds, to function as "in-flight" combiners 1528. That is, processed data values can be conceptualized as being combined on corresponding data processing results (e.g., matching key values) while on the way to (i.e., in-flight) an appropriate reducer 1522.

In some embodiments, reducers 1522 can include accelerated shuffle rxs 1530, to accumulate streamed data sets for reducers 1522. In such an arrangement, processing results from mappers 1518 can be organized and then processed by reducers 1522 as streaming sets of data. In some embodiments, a reducer may not include a shuffle rx 1530 (i.e., is not accelerated). In such cases, streaming collector 1526 can revert operations to a conventional collector (e.g., standard protocol brokered collector to merge).

According to embodiments, any or all of bridge 1526-1, combiners 1528, and shuffle rxs 1530 can be formed by hwa modules as described herein, or equivalents. Such components can be enabled through a job configuration action, which can configure hwa modules for the tasks. While streamers 1526-0 can be implemented as instructions executed by a processor, such as a host processor, in other embodiments, streamers 1526-0 can be implemented by configuring hwa modules. Such embodiments can be conceptualized as a "plug-in" solution to an existing framework (e.g., Hadoop), as acceleration can be realized by including hardware accelerated servers, as described herein and/or by including hwa modules in existing servers implementing the framework.

When included in a system of networked servers, hwa modules, as described herein or equivalents, can be conceptualized as forming a switch/acceleration plane, across which packet data can be switched to implement a data processing framework, such as the map,reduce frameworks described herein.

Figure 16A:
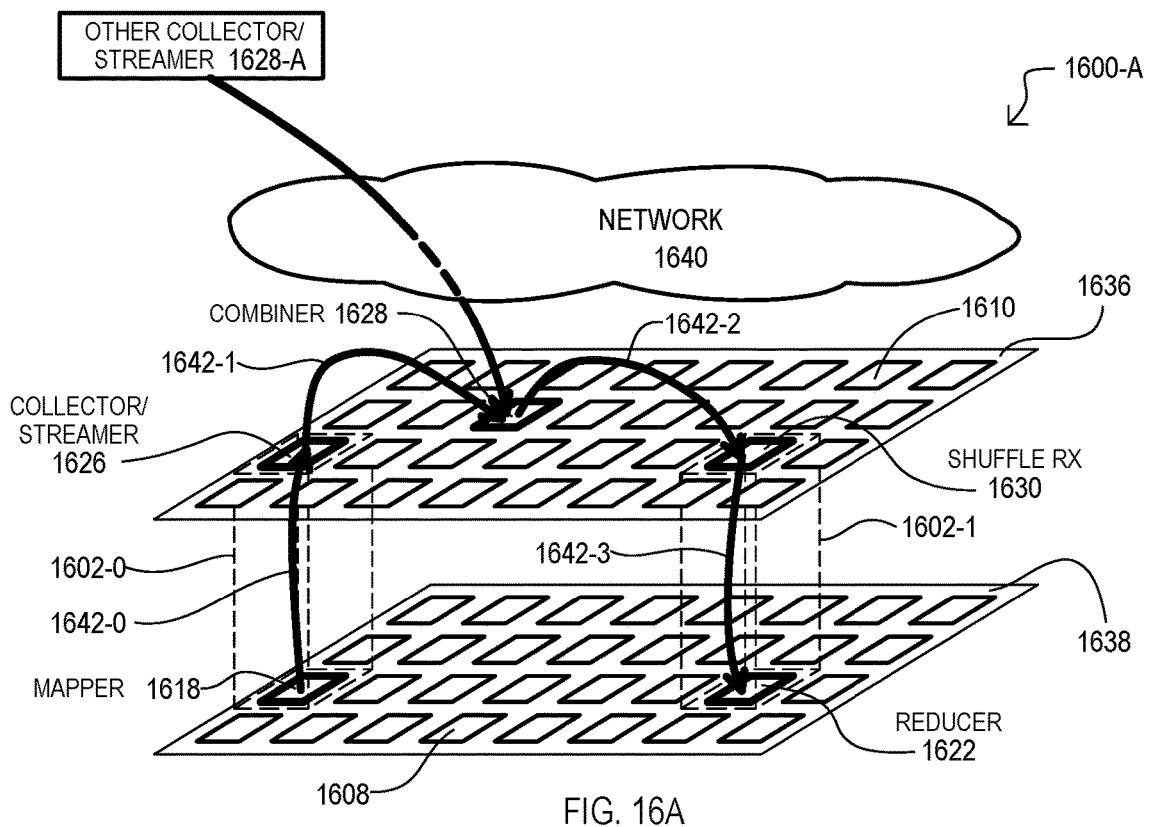
FIGS. 16A and 16B are diagrams of systems, and possible data flows for such systems according to embodiments.

FIG. 16A is a diagram showing a data processing system 1600-A according to another embodiment. A system 1600-A can be formed by servers (two shown as 1602-0/1) having network connections to one another, as described herein, or equivalents. System 1600-A can include a mid-plane 1636 formed from computing elements of hwa modules (one shown as 1610), a host processor plane 1638 formed by computing elements of host processors (one shown as 1608), and another network portion 1640. Mid-plane 1636 can be conceptualized as a hardware acceleration plane for accelerating any of various portions of a data processing operation, such as that of a map,reduce framework. It is understood that hwa modules can operate independent of host processors, receiving packet data, processing packet data, and/or forwarding packet data without intervention from a host processor.

A network portion 1640 can be a network, including the Internet or a gateway to the Internet, and/or can include an aggregation layer, as but a few examples.

It is understood that hardware acceleration plane 1636 and host processor plane 1638 can be a logical representation of system resources. In particular, components of the same server can form parts of different planes of the system. As but one particular example, a system 1600-A can include hardware accelerated servers (1602-0/1) that include one or more hardware acceleration modules and one or more host processors. Such hardware accelerated servers can take the form of any of those shown herein, or equivalents.

According to embodiments, computing elements of hwa modules (e.g., 1610) of hardware acceleration plane 1636 can be configured to accelerate map,reduce operations as described herein. As but a few of many possible example, an hwa module can be configured to operate as any of: collector streamers/bridges (e.g., 1426, 1526-0/1) (referred to herein as collector streamer), combiners (e.g., 1428, 1528), or shuffle rxs (e.g., 1430, 1530).

FIG. 16A shows various possible examples of data flows in a system 1600-A configured with a map, reduce type framework. It is understood such data flows are provided by way of example. From the description herein, it is understood that various other data flows are possible.

Data flow 1642-0 shows the transmission of mapping results from mapper 1618, implemented by a host processor, to a collector streamer 1626, implemented by one or more hwa modules. Collector streamer 1626 can take the form of any of those described herein, or equivalents (e.g., e.g., 1426, 1526-0/1). In the very particular example shown, mapper 1618 and collector streamer 1626 can be part of a same hardware accelerated server 1602-0. As such, data flow 1642-0 may not necessarily be via network protocol (e.g., layer 2 or layer 3), and could be via a bus local to the server 1602-0. Further, a collector streamer 1626 can include a streamer portion in a host processor plane 1638 and a bridge in a hardware acceleration plane 1636.

Data flow 1642-1 shows transmission of processed data from collector streamer 1626 to combiner 1628. Combiner 1628 is implemented by one or more hwa modules (i.e., is in the hardware accelerated plane 1636). Transmission of such data can be according to a network protocol. However, in the event a collector streamer and combiner are on the same hardware accelerated server, or on the same hwa module, such a data flow can be via a local bus, and not necessarily according to a network protocol. According to embodiments, such transmission can perform an in-flight combining operation, forwarding processed data having a certain key to a certain combiner 1628.

Data flow 1642-2 shows transmission of processed data from combiner 1628 to shuffle rx 1630. Shuffle rx 1630 is implemented by one or more hwa modules, or as code executed by a host processor (and so would be in the host processor plane 1638). Accordingly, transmission of such data can be according to a network protocol. However, in the event a combiner and shuffle rx are on the same hardware accelerated server, or on the same hwa module, such a data flow can be via a local bus, and not necessarily a network protocol.

Data flow 1642-3 shows the transmission of data from shuffle rx 1630 to a reducer 1622. Reducer 1622 can be implemented by one or more host processors. In the very particular example shown, shuffle rx 1630 and reducer 1622 can be part of a same hardware accelerated server 1602-1. As such, data flow 1642-3 may not necessarily be via network protocol, and could be via a bus local to the server 1602-1.

Figure 16B:
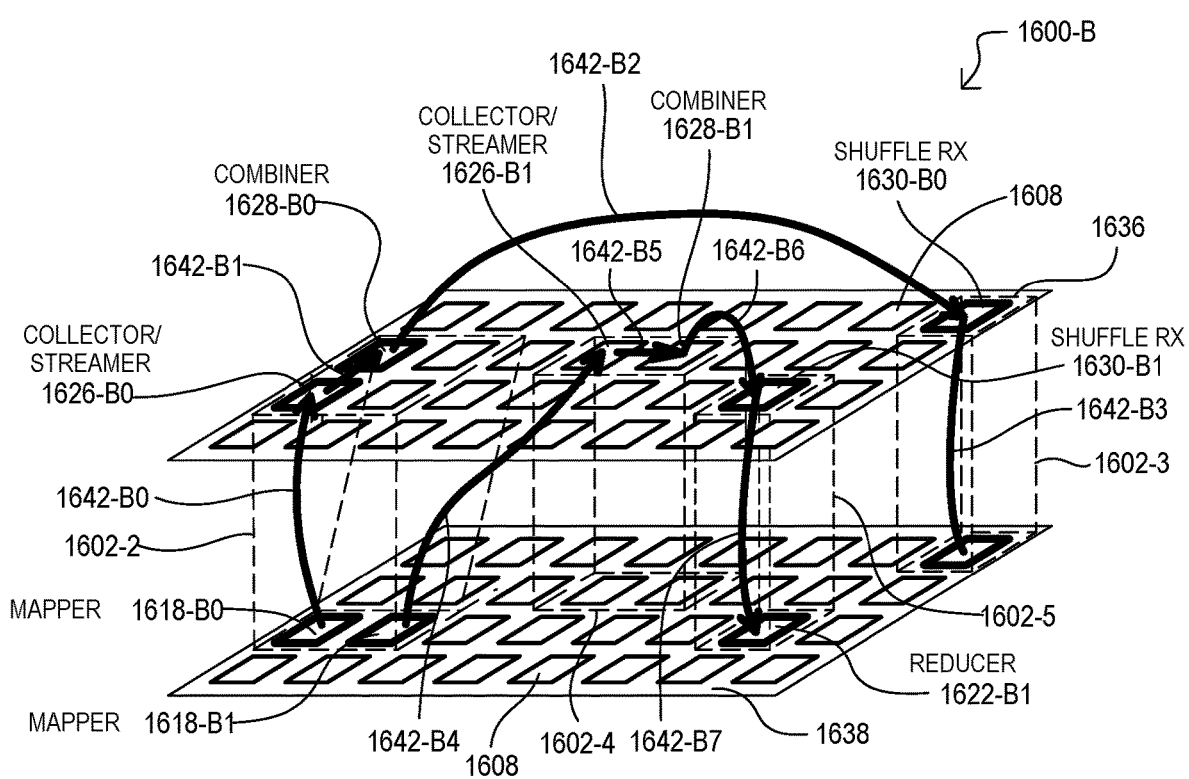

FIG. 16B is a diagram showing a data processing system 1600-B according to another embodiment. A system 1600-B can include components like those of FIG. 16A. FIG. 16B shows how a hardware accelerated server 1602-2 can have multiple mappers 1618-B0/1 and multiple hwa module computing elements. FIG. 16B is provided to illustrate various other possible data flows of a system.

Data flow 1642-B0 can be like 1642-0 shown in FIG. 16A.

Data flow 1642-B1 shows transmission of processed data from collector streamer 1626-B0 to combiner 1628-B0, which can be implemented by hwa computing elements of a same hardware accelerated server 1602-2. Accordingly, transmission of such data can be via local bus, and not necessarily according to a network protocol. In some embodiments, transmission of such data can be over a bus on an hwa module or a bus that commonly connects multiple hwa modules.

Data flow 1642-B2 can be like 1642-2 shown in FIG. 16A.

Data flow 1642-B3 can be like 1642-3 shown in FIG. 16A.

Data flow 1642-B4 shows the transmission of mapping results from mapper 1618-B1 to a collector streamer 1626-B1. Because the computing elements are not in the same server, such transmission can be via a network protocol.

Data flow 1642-B5 can be like 1642-B1 described above.

Data flow 1642-B6 can be like 1642-2 shown in FIG. 16A.

Data flow 1642-B7 can be like 1642-3 shown in FIG. 16A.

As understood from this description, various other data flows are possible.

According to embodiments, a system (e.g., 1600-A/B) can be configured by setting functions of hwa elements to execute the noted functions. Such a configuration can include ensuring combiners (e.g., 1628, 1628-B0/1) are identified (e.g., by network address or physical address) so that collector streamers (e.g., 1626, 1626-B0/1) can forward data to them to accomplish a shuffle type operation.

With reference to the embodiments shown in FIGS. 12-16B, hwas can take the form of any of those described herein. As but one particular example, referring back to FIG. 10, processing circuits 1018 can be configured to execute a desired acceleration for map,reduce type framework, including but not limited to collector streamers/bridges (e.g., 1426, 1526-0/1) (referred to herein as collector streamer), combiners (e.g., 1428, 1528), or shuffle rxs (e.g., 1430, 1530). A transport protocol and/or metadata in such packets can indicate a data flow for the packet.

Figure 17:
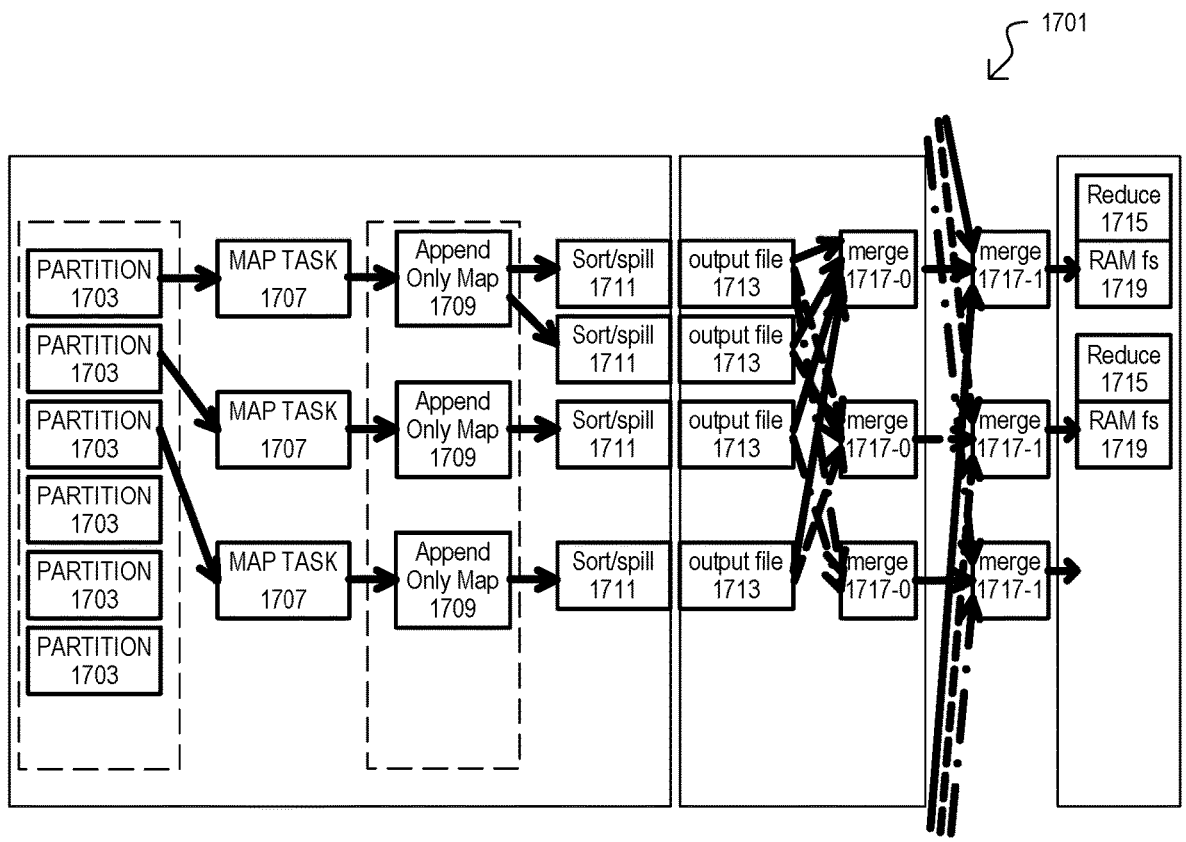
FIG. 17 is a block diagram of a conventional data processing system.

FIG. 17 is a block diagram showing a conventional Apache Spark type data processing system 1701 (for executing map,reduce type processing). System 1701 can include a computing nodes that execute operations in system memory. A system 1701 can have a framework that includes partitions 1703 that store data for processing. Data in partitions 1703 can be processed by mappers 1707. Mappers 1707 can execute such operations "in memory". Mappers 1707 can process data splits to generate key,value pairs (tuples). Such results from each mapping operation can be combined and stored in memory using Append Only Map structures 1709. As processed data values accumulate they can be sorted with a sorter function 1711 and spilled as output files 1713.

In response to requests by reducers 1715, various output files 1713 can be merged, including local merges 1717-0 as well as remote merges 1717-1. Reducers 1715 can include in-memory file systems 1719 to handle merged data values for the reducing operation.

While a conventional system 1701 can provide improvements over systems that repeatedly store results to disks, such as Apache Hadoop, scaling up such systems can require a corresponding increase in system memory (e.g., DRAM) to buffer exchanges between nodes. Further, it may be necessary to limit simultaneous streaming in order to avoid spills to disk.

It would be desirable to arrive at some way of increasing the performance of a systems for processing unstructured data that do not suffer from the drawbacks of conventional approaches.

Figure 18:
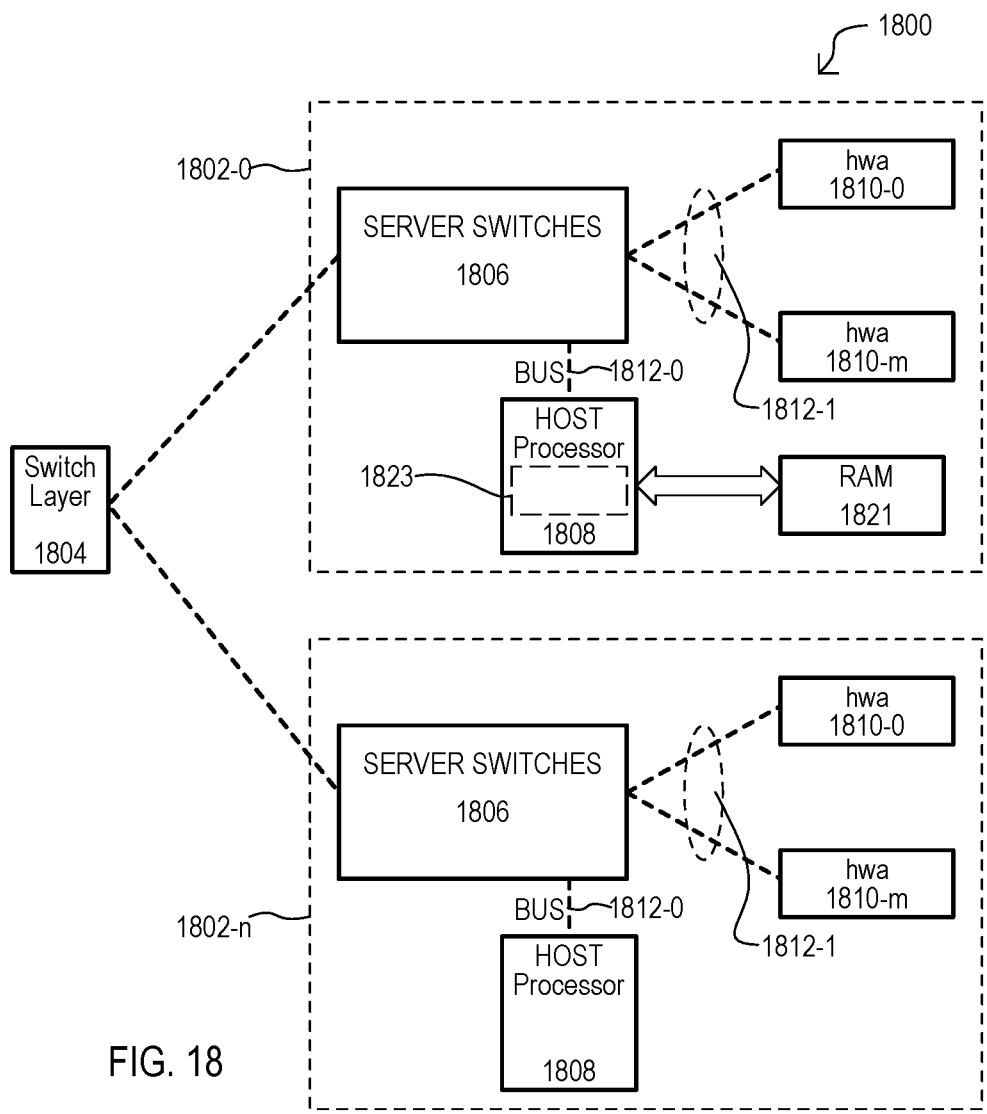
FIG. 18 is a block diagram of a system according to an embodiment.

FIG. 18 is a block diagram of a system 1800 according to an embodiment. A system 1800 can include a number of servers 1802-0 to 1802-n, which can be networked together by one or more switching layers 1804. A switching layer 1804 can include an access pathway to other networks, including other systems, such as a LAN, WAN or the Internet, as but a few examples.

Each server (1802-0 to -*n*) can include server switch(es) 1806, one or more host processors 1808, and one or more hwa modules 1810-0 to -*m*. Server switches 1806 can be connected to host processor 1808 and hwa modules (1810-0 to -*m*) by one or more buses 1812-0/1. Buses 1812-0/1 can be any suitable bus, including but not limited to a system bus (e.g., PCI, PCIe etc.) and/or memory bus (e.g., various generations of DDR, Hybrid Memory Cube, High Bandwidth Memory, etc.). Server switches 1806 can include one or more network switches that enable packet data to be switched between switch layer 1804, host processor 1808, and hwa modules 1810-0 to -*m*. Server switches 1806 can be connected host processor 1808 and hwa modules (1810-0 to -*m*).

In particular embodiments, servers (1802-0 to -*n*) can use memory mapping configured to access hwa modules (1810-0 to -*m*). In a very particular embodiment, a mmap routine can be modified to execute code corresponding to a driver for an hwa module (1810-0 to -*m*). However, such a particular implementation should not be construed as limiting.

In operation, servers (1802-0 to -*n*) can receive packet data representing processing results from various other nodes of a larger system. Data within such packets can be processed by operation of hwa modules (1810-0 to -*m*) and/or host processor 1808. Hwa modules (1810-0 to -*m*) can process data independent of host processor 1808 to accelerate the processing of data. Processed data can be output from the server (1802-0 to -*n*). Packet data can be received and transmitted according to any suitable protocol, including layer 2 or layer 3 protocols, as well as via a vpn overlaying the system.

In very particular embodiments, one or more servers (e.g., 1802-0) can include a system memory 1821 for executing in-memory processing of data. That is, data can be processed without having to write to a peripheral non-volatile memory, such as a storage disk. That is, a host processor 1808 of the server 1802-0 can be configured to execute data processing in memory 1821 by the execution of instructions 1823.

Figure 19:
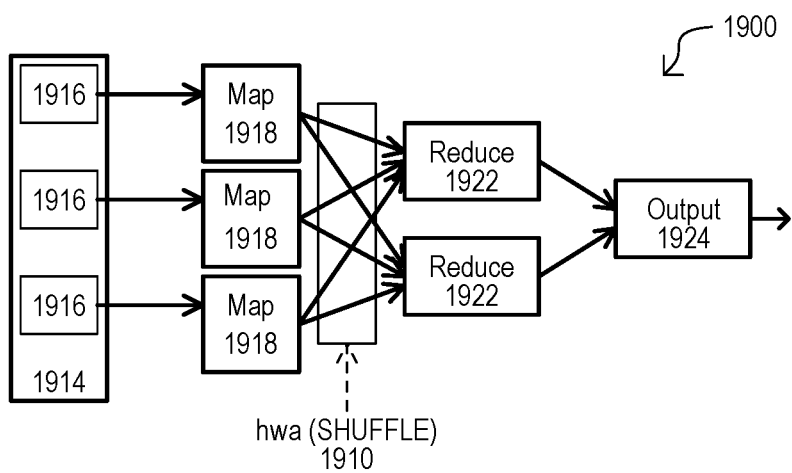
FIG. 19 is a diagram of a system and data processing flow according to another embodiment.

FIG. 19 shows is a diagram of a system 1900 according to another embodiment. A system 1900 can have a distributed architecture for implementing multi-stage data processing, with one or more data gathering steps. In a particular embodiment, system 1900 can be one example of that shown in FIG. 18. In some embodiments, the workflow can implement a map,reduce processing, such as Apache Spark, as but one very particular example.

A system 1900 can include storage 1914, first processing nodes 1918, networked hwa modules 1910, second processing nodes 1922, and an output operation 1924.

First processing nodes 1918 can perform a same type of in-memory processing, in parallel, on data partitions 1916 of storage 1914. Such processing can generate data values that can be reorganized according to the processing results. In some embodiments, first processing nodes 1918 can execute mapping operations in a map,reduce type operation. As such, mapping nodes 1918 can generate data tuples formed of key, value pairs. In very particular embodiments, first processing nodes 1918 can be mappers in a Spark type architecture.

Networked hwa modules 1910 can be a group of hwa modules, as described herein or equivalents, networked together and to first processing nodes 1918 and second processing nodes 1922. Networked hwa modules 1910 can receive processing results from first processing nodes 1918 and forward them to selected second processing nodes 1922. In some embodiments, hwa modules 1910 can forward data from first nodes 1918 based on the processing results from the first nodes. In a particular embodiment, hwa modules 1910 can execute a shuffle operation of a map,reduce type operation, sending data from mappers (e.g., 1918) to a particular reducer (e.g., 1922) based on the key value of the processed data. Thus, in such an embodiment, tuples can be gathered based on their values. According to embodiments, hwa modules 1910 can stream processing results to second nodes 1922. That is, results from first nodes 1918 can be sent as packet data to second nodes 1922. A stream of processing results can include the transmission of a sequence of processing results over time. In particular embodiments, it can include sequential processing results divided into different data packets.

Second nodes 1922 can further process data received from hwa modules 1910. In some embodiments, second processing nodes 1922 can execute reduce operations in a map, reduce type framework with in-memory processing. In very particular embodiments, second processing nodes 1922 can be reducers in a Spark type architecture. In map,reduce architectures, reducers (e.g., 1922) can generate smaller sets of tuples from sets of tuples gathered by the shuffle operation. An optional output operation 1924 can organize processing results from second nodes 1922.

Referring once again to FIG. 14, a system 1400 according to another embodiment will be described. A system 1400 can include a midplane switch architecture and include host processors (one shown as 1408), hwa modules (one shown as 1410) and switches (one shown as 1406). According to embodiments, a system 1400 can be configured as one implementation of that shown in FIG. 18.

Server processors 1410 can be mappers 1418 and/or reducers 1422. Mappers 1410 can take any suitable form, executing mapping operations in-memory. In particular embodiments, mappers 1410 can be Spark type mappers. Reducers 1422 can take any suitable form, executing reducing operations in-memory. In some embodiments, reducers 1422 can be conventional Spark type reducers. However, in other embodiments, reducers 1422 can operate in conjunction with a shuffle receiver.

Figure 20:
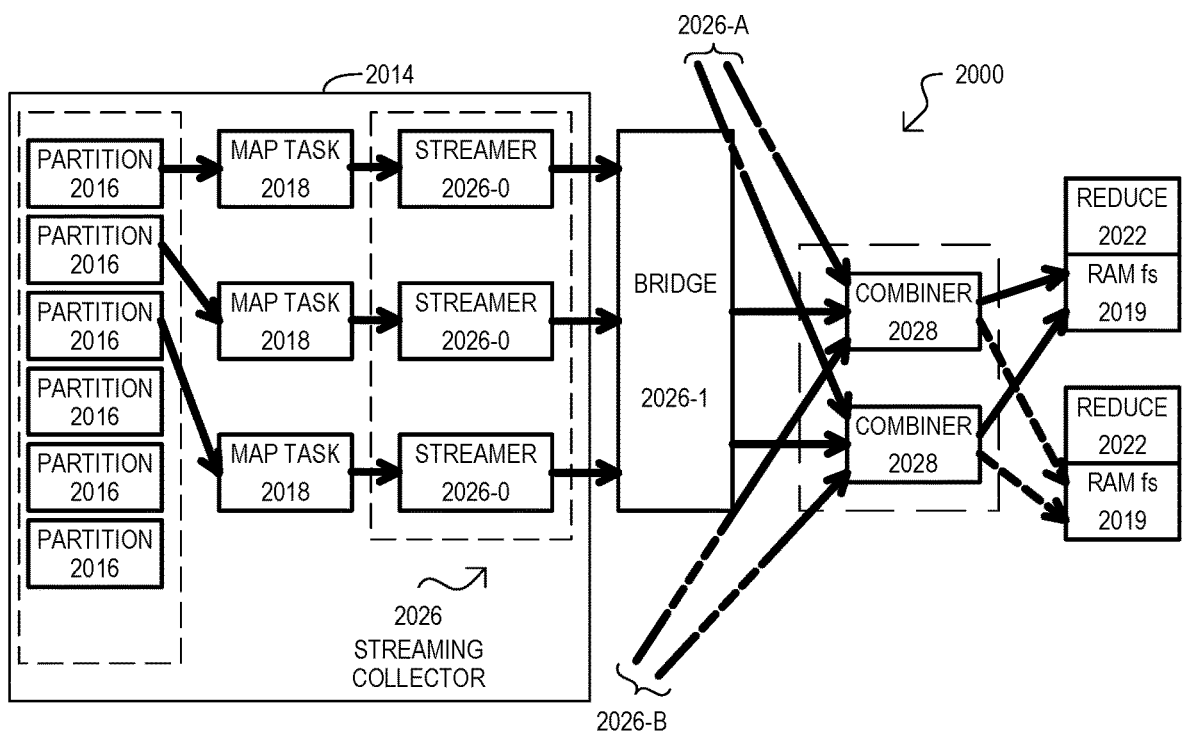
FIG. 20 is a diagram of a system according to a further embodiment.

FIG. 20 is a diagram of another system 2000 according to an embodiment. In some embodiments, a system 2000 can be one implementation of that shown in FIG. 19. System 2000 can provide map, reduce type processing, with shuffle combine operations that can be accelerated by hwa modules. This can allow large number of streams of mapping results to flow from mappers to reducers, as processing results are generated, for the processing of large amounts of data without necessarily increasing buffer (e.g., system RAM) size.

In a very particular embodiment, a system 2000 can be created by adding and configuring hwa modules into an existing map,reduce framework. That is, system 2000 can be a plug-in solution for existing systems (e.g., Spark) to accelerate performance.

A system 2000 can include a memory 2014, in-memory mappers 2018, a streaming collector sub-system 2026, in-flight combiners 2028, and in-memory reducers 2022. Memory 2014 can include partitions 2016 that store data for processing. Mappers 2018 can operate on data from partitions, in-memory, according to a given map,reduce operation. In particular embodiments, mappers 2018 can be Spark type mappers. In some embodiments, mappers 2018 can be processing nodes created by server systems with mapper instructions executed by a host processor.

Output data from mappers can be received by a streaming collector subsystem 2026. Subsystem 2026 can include streamers 2026-0 and bridge 2026-1. In the embodiment shown, each streamer 2026-0 can receive data processed by a corresponding mapper 2018. Such data can be forwarded to bridge 2026-1, which can identify an appropriate combiner 2028. As understood from FIG. 20, combiner 2028 can receive processed data from various other streaming collector subsystems 2026-A/B over a network connection. Other streaming collector subsystems 2026-A/B can be part of other systems processing other data splits. In some embodiments, a streaming collector subsystem 2026 can start outputting processed data provided by mappers 2018 for one data set before the processing is complete on that data set. That is, streaming collector subsystem 2026 can stream processed data as it is generated. In particular embodiments, a streaming collector subsystem 2026 can output data processed by mappers 2018 at a rate equal to or greater than the rate at which mappers 2018 generate the processed data. In a very particular embodiment, an overall rate at which a streaming collector subsystem 2026 can output processed data for a data set (e.g., of a partition 2016) can be greater than the overall rate at which the mapper 2018 can generate the processed data for that data set.

Combiners 2028 can combine received data values to provide data values redistributed based on processing results. In particular embodiments, combiners 2028 can provide outputs of tuples with like key values as in a conventional map,reduce operation. However, according to embodiments, combiners 2028 can operate at very high speeds, to function as "in-flight" combiners 2028. That is, processed data values can be conceptualized as being combined based on corresponding data processing results (e.g., matching key values) while on the way to (i.e., in-flight) an appropriate reducer 2022. This can alleviate and/or eliminate the need to include a certain amount of system RAM to buffer such results, and "spill" them into a particular data format.

In some embodiments, reducers 2022 can include an in-memory file system 2019 to access streamed data sets. In such an arrangement, processing results from mappers 2018 can be organized and then processed by reducers 2022 as streaming sets of data.

According to embodiments, any or both of bridge 2026-1 or combiners 2028 can be formed by hwa modules as described herein, or equivalents. Such components can be enabled through a job configuration action, which can configure hwa modules for the tasks. While streamers 2026-0 can be implemented as instructions executed by a processor, such as a host processor, in other embodiments, streamers 2026-0 can be implemented by configuring hwa modules. Such embodiments can be conceptualized as a "plug-in" solution to an existing framework (e.g., Spark), as acceleration can be realized by including hardware accelerated servers, as described herein and/or by including hwa modules in existing servers implementing the framework.

Embodiments like those shown in FIGS. 18-20 could take the form of those shown in FIGS. 16A and 16B, or an equivalent.

With reference to the embodiments shown in FIGS. 18-20, hwas can take the form of any of those described herein. As but one particular example, referring back to FIG. 10, a host processor 1008 can execute in-memory processing of data as a mapper and/or reducer.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A device, comprising:
a server that includes a host processor and at least one hardware acceleration (hwa) module physically separate from the host processor and having
a network interface configured to virtualize functions by redirecting network packets to different addresses within the hwa,
at least one computing element formed thereon, the at least one computing element including
processing circuits configured to execute a plurality of processes including at least one virtualized function,
a scheduler circuit configured to allocate a priority to a processing of packets of one flow over those of another flow by the processing circuits,
first memory circuits,
second memory circuits, and
a data transfer fabric configured to enable data transfers between the processing circuits and the first and second memory circuits; wherein
the at least one computing element is configured to transfer data to, or receive data from, any of: the processing circuits, the first memory circuits, the second memory circuits, or other computing elements coupled to the data transfer fabric.

2. The device of claim 1, wherein:
the hwa module includes a physical interface configured to connect to a bus of the server.

3. The device of claim 2, further including:
other computing elements formed on other hwa modules connected to a same bus of the server.

4. The device of claim 2, further including:
other computing elements in a server different than the server that includes the at least one computing element.

5. The device of claim 1, wherein:
the data transfer fabric is a time division multiplexed (TDM) fabric configured to enable data transfer within predetermined time slots.

6. The device of claim 5, wherein:
the TDM fabric comprises buses formed with at least one programmable logic device.

7. The device of claim 1, wherein:
the processing circuits comprise at least one module processor.

8. The device of claim 7, wherein:
the host processor is different than the at least one module processor.

9. The device of claim 7, wherein:
the at least one module processor has a reduced instruction set computing architecture.

10. The device of claim 1, wherein:
the second memory circuits are configured to store data for processing by the at least one computing element.

11. The device of claim 10, wherein:
the first memory circuits are configured to store instructions for execution by the processing circuits.

12. The device of claim 11, wherein:
the second memory circuits have a faster access time than the first memory circuits.

13. The device of claim 10, wherein:
the second memory circuits comprise static random access memory (SRAM) circuits; and
the first memory circuits are not SRAM circuits.

14. The device of claim 10, wherein:
the first memory circuits comprise dynamic random access memory (DRAM) circuits; and
the second memory circuits comprise static random access memory (SRAM) circuits.

15. The device of claim 1, wherein:
the plurality of processes comprise different kernels configured to each separately transfer data to, or receive data from, circuits in any of the computing elements.

16. The device of claim 15, wherein:
the kernels are functions operable in a framework for heterogenous computing systems.

17. The method of claim 16, wherein:
the kernels are Open Computing Language (OpenCL) kernels.

18. The device of claim 1, wherein:
the data transfer fabric is a time division multiplexed (TDM) fabric configured to enable data transfer within predetermined time slots; and
the processing circuits are configured execute data transfers in predetermined time slots of the TDM fabric.

19. The device of claim 1, wherein:
the data transfer fabric is configured to store data received from a source external to the at least one computing element in the second memory circuits.

20. The device of claim 1, wherein:
the data transfer fabric is configured to transfer data through the at least one computing element without operations being performed that change the data.

* * * * *